(12) United States Patent
Schardt et al.

(10) Patent No.: US 10,754,624 B2
(45) Date of Patent: Aug. 25, 2020

(54) ACCELERATOR GENERATION USING PARALLEL SYNTHESIS AND SIMULATION

(71) Applicant: International Business Machines Corporation, Armonk, NY (US)

(72) Inventors: Paul E. Schardt, Rochester, MN (US); Jim C. Chen, Rochester, MN (US); Lance G. Thompson, Rochester, MN (US); James E. Carey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/007,619

(22) Filed: Jun. 13, 2018

(65) Prior Publication Data

US 2019/0384578 A1 Dec. 19, 2019

(51) Int. Cl.
*G06F 30/30* (2020.01)
*G06F 30/327* (2020.01)
(Continued)

(52) U.S. Cl.
CPC .................. *G06F 8/30* (2013.01); *G06F 8/60* (2013.01); *G06F 11/3664* (2013.01)

(58) Field of Classification Search
CPC .......... G06F 8/30; G06F 8/60; G06F 11/3664; G06F 30/33; G06F 30/337; G06F 30/347; G06F 30/343; G06F 30/367; G06F 30/327
See application file for complete search history.

(56) References Cited

U.S. PATENT DOCUMENTS

| 6,836,877 B1 * | 12/2004 | Dupenloup | G06F 17/5045 716/103 |
| 6,865,500 B1 * | 3/2005 | Variyam | G01R 31/01 324/762.03 |

(Continued)

OTHER PUBLICATIONS

Schardt et al., "Coalescing Multiple Accelerators Into a Single Accelerator" U.S. Appl. No. 16/132,893, filed Sep. 17, 2018.
(Continued)

*Primary Examiner* — Chat C Do
*Assistant Examiner* — Noor Alkhateeb
(74) *Attorney, Agent, or Firm* — Martin & Associates, LLC; Derek P. Martin

(57) ABSTRACT

An accelerator image generator includes a synthesis block and a simulation block. The accelerator image generator receives a hardware description language representation for a desired function, inputs the hardware description language representation for the desired function to the synthesis block and to the simulation block so the synthesis block and simulation block work in parallel, monitors progress of the synthesis block and the simulation block, and when a defined threshold is reached in the synthesis block, halts the simulation block while the synthesis block continues until the synthesis block outputs an accelerator image for deployment to a programmable device. When an error is detected in the synthesis block following halting of the simulation block, the simulation block may be resumed, and the defined threshold may be adjusted. The accelerator image can be deployed to a programmable device to provide a hardware accelerator corresponding to the accelerator image.

19 Claims, 20 Drawing Sheets

(51) Int. Cl.
*G06F 30/337* (2020.01)
*G06F 30/343* (2020.01)
*G06F 30/347* (2020.01)
*G06F 30/367* (2020.01)
*G06F 8/30* (2018.01)
*G06F 11/36* (2006.01)
*G06F 8/60* (2018.01)

(56) References Cited

U.S. PATENT DOCUMENTS

| | | | |
|---|---|---|---|
| 7,346,863 B1* | 3/2008 | Pritchard | G06F 17/5054 |
| | | | 716/102 |
| 7,984,398 B1* | 7/2011 | Jadcherla | G06F 17/504 |
| | | | 716/104 |
| 9,600,618 B2 | 3/2017 | Greenwood et al. | |
| 9,607,120 B2 | 3/2017 | Greenwood et al. | |
| 9,922,150 B1* | 3/2018 | Yiannacouras | G06F 17/5072 |
| 10,262,390 B1 | 4/2019 | Sun et al. | |
| 10,445,118 B2 | 10/2019 | Guo et al. | |
| 2002/0191760 A1* | 12/2002 | Wattwood | H04L 12/4608 |
| | | | 379/93.01 |
| 2005/0144585 A1* | 6/2005 | Daw | G01R 31/318314 |
| | | | 716/104 |
| 2010/0057425 A1* | 3/2010 | Gerowitz | G06F 17/5068 |
| | | | 703/14 |
| 2010/0327922 A1* | 12/2010 | Ando | G11C 7/1051 |
| | | | 327/141 |
| 2012/0185916 A1* | 7/2012 | Chae | G06F 21/316 |
| | | | 726/2 |
| 2013/0067274 A1* | 3/2013 | Huang | G06F 13/12 |
| | | | 714/6.22 |
| 2014/0282312 A1* | 9/2014 | Stamness | G06F 17/5022 |
| | | | 716/106 |
| 2015/0339130 A1* | 11/2015 | Kruglick | G06F 9/44505 |
| | | | 713/100 |
| 2016/0112274 A1* | 4/2016 | Biem | H04L 41/145 |
| | | | 703/22 |
| 2017/0060606 A1 | 3/2017 | Hollinger et al. | |
| 2018/0018200 A1* | 1/2018 | Goodson | G06F 9/4881 |
| 2020/0042353 A1 | 2/2020 | Arrasjid et al. | |

OTHER PUBLICATIONS

IBM, Appendix P—List of IBM Patents or Patent Applications Treated as Related, dated Jan. 28, 2019.

Aldec, UVM Simulation Acceleration, printed from https://www.aldec.com/en/solutions/hardware_emulation_solutions/acceleration on May 16, 2018.

Paiz et al., Hardware-In-The-Loop Simulations for FPGA-Based Digital Control Design, in Cetto et al., Informatics in Control Automation and Robotics. Lecture Notes Electrical Engineering, vol. 15. Springer, Berlin, Heidelberg, 2008.

* cited by examiner

| Accelerator Catalog 1000 | | | | | | | | | |
|---|---|---|---|---|---|---|---|---|---|
| Name | Location | LRU | MRU | Error Rate | Dependencies | Capabilities | Latency | Other Characteristic(s) | |
| Acc1 | <path> | <time> | <time> | X/100 runs | Acc2 | FP Unit | 1.0 us | Includes NW connection | |
| ... | ... | ... | ... | ... | ... | ... | ... | ... | |
| AccN | <path> | <time> | <time> | Y/100 runs | None | Graphics | 500 ns | Affinity to Acc5 | |

FIG. 10

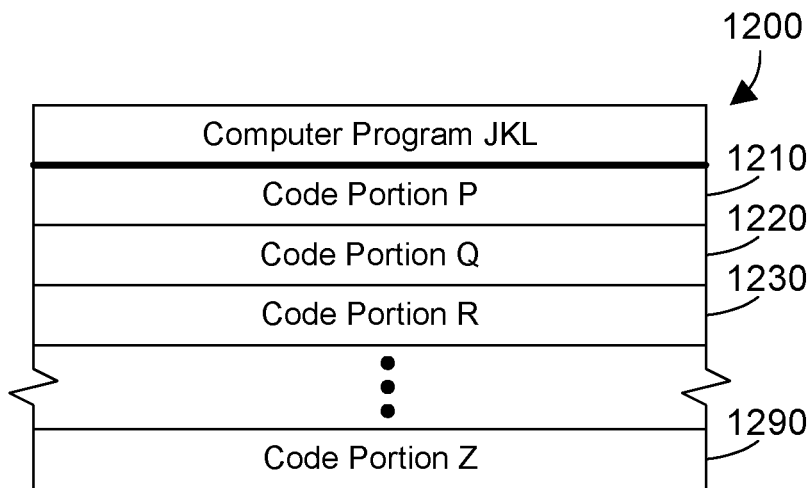
FIG. 12
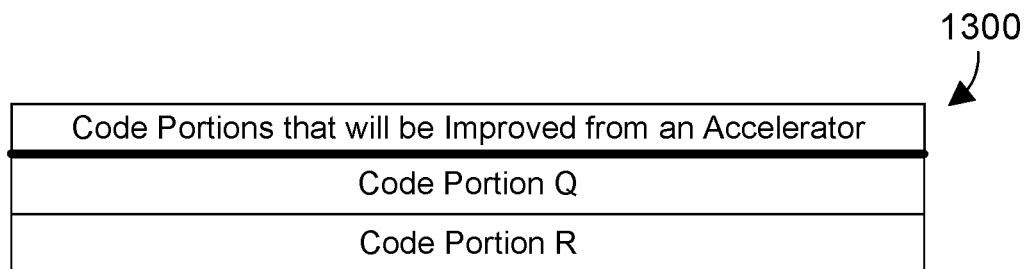
FIG. 13
| Accelerator Catalog | | | | | |
|---|---|---|---|---|---|
| Name | Location | LRU | MRU | Error Rate | Dependencies |
| AccQ | <path> | <time> | <time> | X/100 runs | None |
FIG. 14

US 10,754,624 B2

ACCELERATOR GENERATION USING PARALLEL SYNTHESIS AND SIMULATION

BACKGROUND

1. Technical Field

This disclosure generally relates to computer systems, and more specifically relates to hardware accelerators in computer systems.

2. Background Art

The Open Coherent Accelerator Processor Interface (OpenCAPI) is a specification developed by a consortium of industry leaders. The OpenCAPI specification defines an interface that allows any processor to attach to coherent user-level accelerators and I/O devices. OpenCAPI provides a high bandwidth, low latency open interface design specification built to minimize the complexity of high-performance accelerator design. Capable of 25 gigabits (Gbits) per second per lane data rate, OpenCAPI outperforms the current peripheral component interconnect express (PCIe) specification which offers a maximum data transfer rate of 16 Gbits per second per lane. OpenCAPI provides a data-centric approach, putting the compute power closer to the data and removing inefficiencies in traditional system architectures to help eliminate system performance bottlenecks and improve system performance. A significant benefit of OpenCAPI is that virtual addresses for a processor can be shared and utilized in an OpenCAPI device, such as an accelerator, in the same manner as the processor. With the development of OpenCAPI, hardware accelerators may now be developed that include an OpenCAPI architected interface.

BRIEF SUMMARY

An accelerator image generator includes a synthesis block and a simulation block. The accelerator image generator receives a hardware description language representation for a desired function, inputs the hardware description language representation for the desired function to the synthesis block and to the simulation block so the synthesis block and simulation block work in parallel, monitors progress of the synthesis block and the simulation block, and when a defined threshold is reached in the synthesis block, halts the simulation block while the synthesis block continues until the synthesis block outputs an accelerator image for deployment to a programmable device. When an error is detected in the synthesis block following halting of the simulation block, the simulation block may be resumed, and the defined threshold may be adjusted. The accelerator image can be deployed to a programmable device to provide a hardware accelerator corresponding to the accelerator image.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 is a block diagram showing a sample accelerator catalog;

FIG. 12 is a block diagram showing a second sample computer program with different code portions;

FIG. 13 is a block diagram identifying two code portions in the computer program in FIG. 12 that would benefit from an accelerator;

FIG. 14 is a block diagram showing a sample accelerator catalog that includes an accelerator that corresponds to code portion Q;

DETAILED DESCRIPTION

Figure 1:
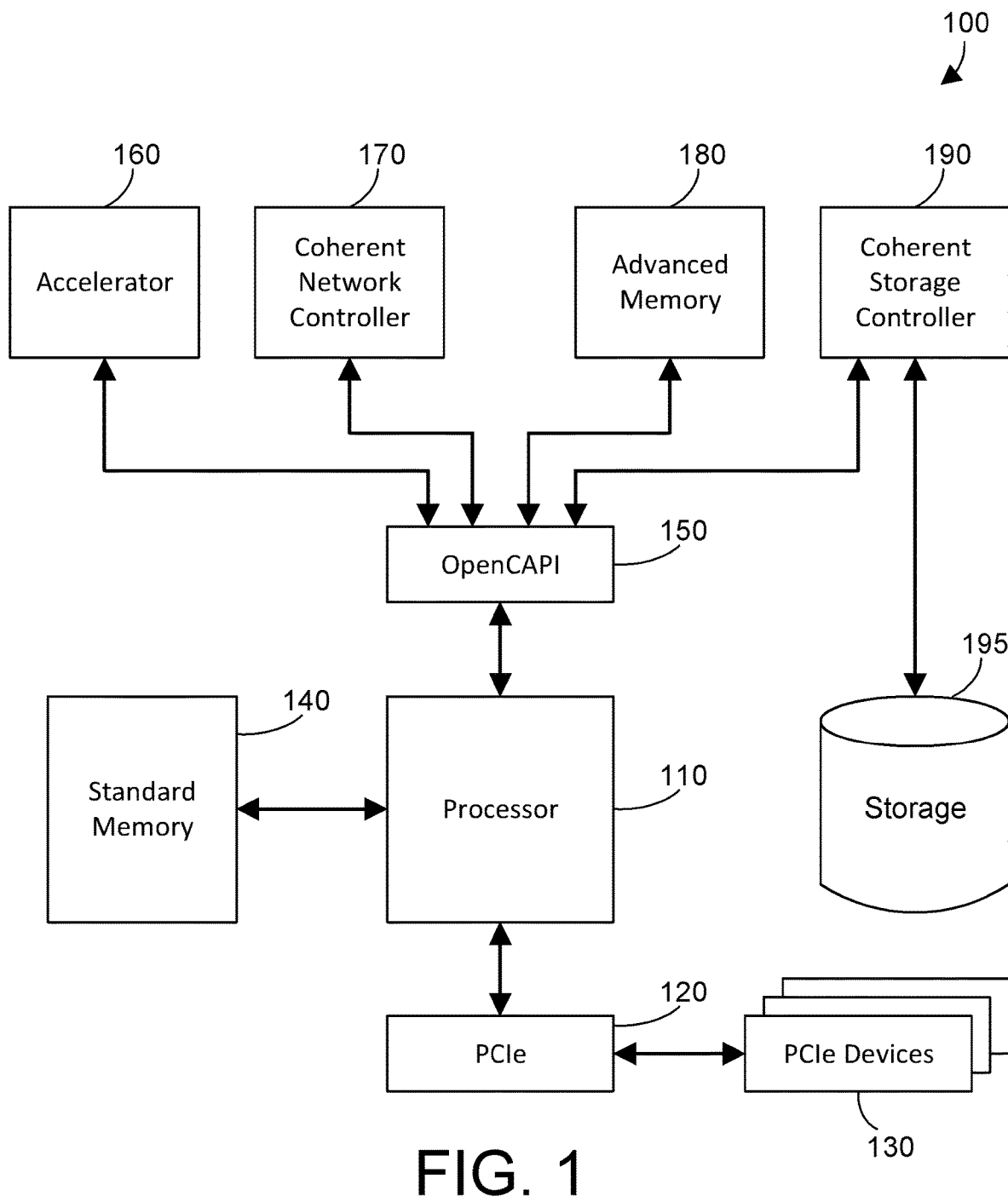
FIG. 1 is a block diagram of a sample system illustrating how an Open Coherent Accelerator Processor Interface (OpenCAPI) can be used.

As discussed in the Background Art section above, the Open Coherent Accelerator Processor Interface (OpenCAPI) is a specification that defines an interface that allows any processor to attach to coherent user-level accelerators and I/O devices. Referring to FIG. 1, a sample computer system 100 is shown to illustrate some of the concepts related to the OpenCAPI interface 150. A processor 110 is coupled to a standard memory 140 or memory hierarchy, as is known in the art. The processor is coupled via a PCIe interface 120 to one or more PCIe devices 130. The processor 110 is also coupled via an OpenCAPI interface 150 to one or more coherent devices, such as accelerator 160, coherent network controller 170, advanced memory 180, and coherent storage controller 190 that controls data stored in storage 195. While the OpenCAPI interface 150 is shown as a separate entity in FIG. 1 for purposes of illustration, instead of being a separate interface as shown in FIG. 1, the OpenCAPI interface 150 can be implemented within each of the coherent devices. Thus, accelerator 160 may have its own OpenCAPI interface, as may the other coherent devices 170, 180 and 190. One of the significant benefits of OpenCAPI is that virtual addresses for the processor 110 can be shared with coherent devices that are coupled to or include an OpenCAPI interface, permitting them to use the virtual addresses in the same manner as the processor 110.

Figure 2:
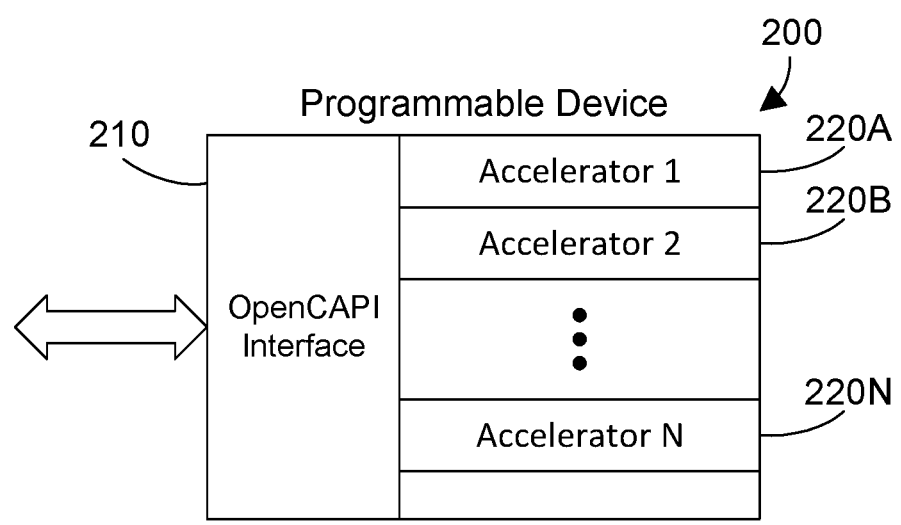
FIG. 2 is a flow diagram of a programmable device with an OpenCAPI interface that may include one or more hardware accelerators.

Referring to FIG. 2, a programmable device 200 represents any suitable programmable device. For example, the programmable device 200 could be an FPGA or an ASIC. An OpenCAPI interface 210 can be implemented within the programmable device. In addition, one or more accelerators can be implemented in the programmable device 200. FIG. 1 shows by way of example accelerator 1 220A, accelerator 2 220B, . . . , accelerator N 220N. In the prior art, a human designer would determine what type of accelerator is needed based on a function that needs to be accelerated by being implemented in hardware. The accelerator function could be represented, for example, in a hardware description language (HDL). Using known tools, the human designer can then generate an accelerator image that corresponds to the HDL. The accelerator image, once loaded into the programmable device such as 200 in FIG. 2, creates an accelerator in the programmable device that may be called as needed by one or more computer programs to provide the hardware accelerator(s).

An accelerator image generator includes a synthesis block and a simulation block. The accelerator image generator receives a hardware description language representation for a desired function, inputs the hardware description language representation for the desired function to the synthesis block and to the simulation block so the synthesis block and simulation block work in parallel, monitors progress of the synthesis block and the simulation block, and when a defined threshold is reached in the synthesis block, halts the simulation block while the synthesis block continues until the synthesis block outputs an accelerator image for deployment to a programmable device. When an error is detected in the synthesis block following halting of the simulation block, the simulation block may be resumed, and the defined threshold may be adjusted. The accelerator image can be deployed to a programmable device to provide a hardware accelerator corresponding to the accelerator image.

Figure 3:
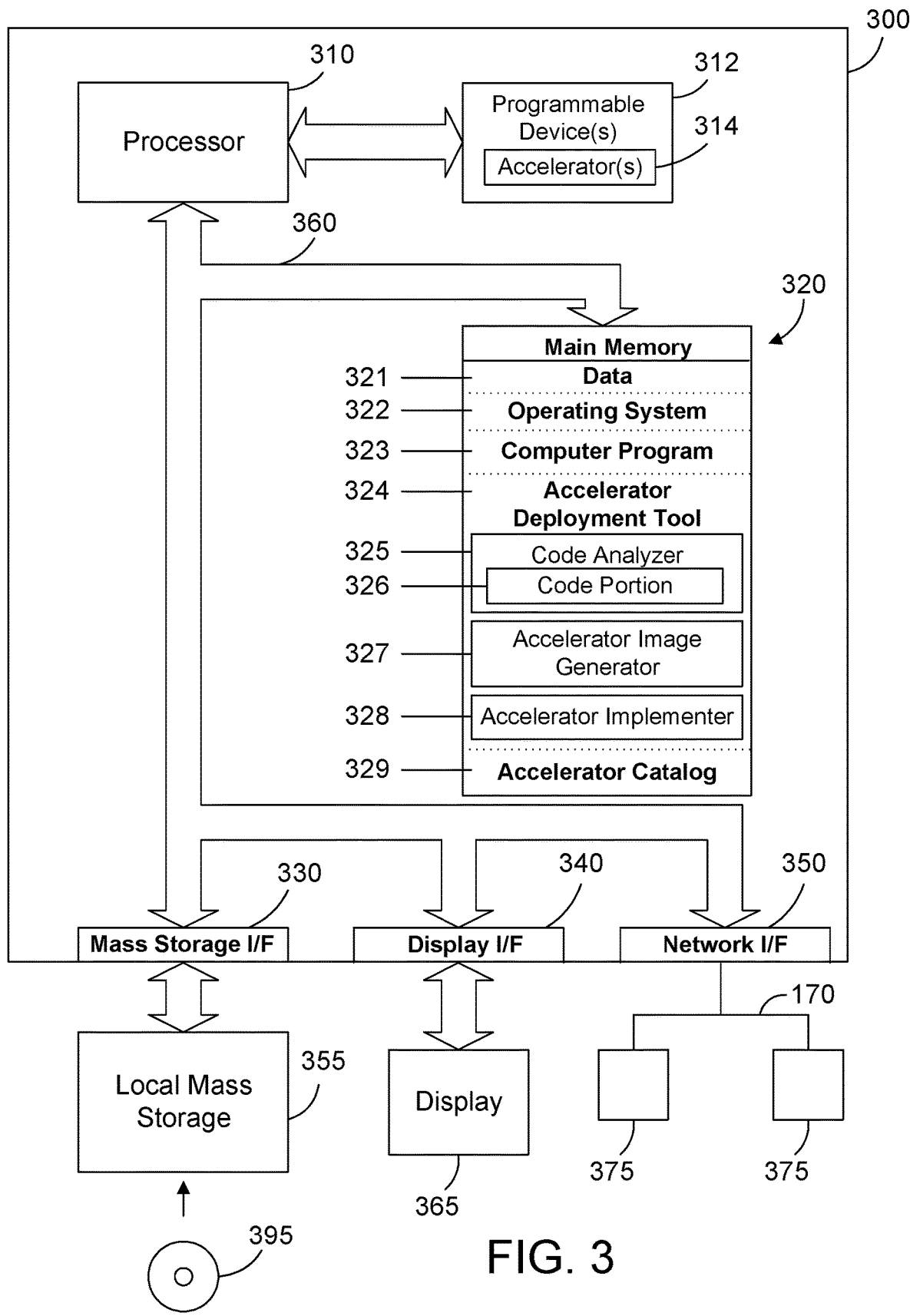
FIG. 3 is a block diagram of a computer system that includes a tool for dynamically generating and deploying an accelerator.

Referring to FIG. 3, a computer system 300 is one suitable implementation of a computer system that includes an accelerator deployment tool that automatically selects one or more a programmable devices based on feature sets compared to resource requirements, and automatically deploys one or more accelerator images on the programmable device(s), as described in more detail below. Server computer system 300 is an IBM POWER9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 3, computer system 300 comprises one or more processors 310, one or more programmable devices 312, a main memory 320, a mass storage interface 330, a display interface 340, and a network interface 350. These system components are interconnected through the use of a system bus 360. Mass storage interface 330 is used to connect mass storage devices, such as local mass storage device 355, to computer system 300. One specific type of local mass storage device 355 is a readable and writable CD-RW drive, which may store data to and read data from a CD-RW 395. Another suitable type of local mass storage device 355 is a card reader that receives a removable memory card, such as an SD card, and performs reads and writes to the removable memory. Yet another suitable type of local mass storage device 355 is universal serial bus (USB) that reads a storage device such a thumb drive.

Main memory 320 preferably contains data 321, an operating system 322, a computer program 323, an accelerator deployment tool 324, and an accelerator catalog 329. Data 321 represents any data that serves as input to or output from any program in computer system 300. Operating system 322 is a multitasking operating system, such as AIX or LINUX. Computer program 323 represents any suitable computer program, including without limitations an application program, an operating system, firmware, a device driver, etc. The accelerator deployment tool 324 preferably includes a code analyzer 325, an accelerator image generator 327, and an accelerator implementer 328. The code analyzer 325 analyzes the computer program 324 as it runs to determine its run-time performance. One suitable way for code analyzer 325 to analyze the computer program is using known techniques for monitoring the run-time performance of a computer program. For example, tools exist in the art that allow real-time monitoring of the run-time performance of a computer program using a monitor external to the computer program that detects, for example, which addresses are being executed by the processor 310 during the execution of the computer program 323. Other tools known as profilers allow inserting instrumentation code into a computer program, which is code that increments different counters when different branches of the computer program are executed.

The values of the counters can be analyzed to determine the frequency of executing each portion of the computer program. The code analyzer 325, after analyzing the run-time performance of the computer program, identifies a code portion 326, which is a portion of code in the computer program 323, that will be improved from being deployed to a hardware accelerator to enhance the run-time performance of the computer program 323.

The accelerator image generator 327 dynamically generates an accelerator image corresponding to the code portion 326 in the computer program 323 identified by the code analyzer 325. The accelerator image generator 327 may generate an accelerator image from code portion 326 using any suitable method. For example, the accelerator image generator 327 could generate an equivalent hardware description language (HDL) representation of the code portion 326, then synthesize the HDL representation into a suitable accelerator image for the programmable device 312. The accelerator implementer 328 preferably takes an accelerator image generated by the accelerator image generator 327, and uses the accelerator image to program the programmable device 312, thereby generating a hardware accelerator 314 in programmable device 312 that corresponds to the code portion 326.

In a first implementation, the accelerator deployment tool 324 dynamically generates an accelerator image corresponding to the code portion 326 of the computer program 323, then programs the programmable device with the accelerator image so the programmable device includes a hardware accelerator that corresponds to the code portion 326. In a second implementation, an accelerator catalog 329 is provided and maintained. The accelerator catalog 329 preferably includes a listing of previously-generated accelerators. In the second implementation, the accelerator deployment tool 324 first checks the accelerator catalog 329 to see if a previously-generated accelerator is available for the code portion 326. If so, the accelerator deployment tool 324 deploys a previously generated accelerator image identified in the accelerator catalog. If not, the accelerator deployment tool 324 dynamically generates an accelerator image as described above, then loads the image into the programmable device 312 to provide the accelerator 314 that corresponds to the code portion 326.

Computer system 300 utilizes well known virtual addressing mechanisms that allow the programs of computer system 300 to behave as if they only have access to a large, contiguous address space instead of access to multiple, smaller storage entities such as main memory 320 and local mass storage device 355. Therefore, while data 321, operating system 322, computer program 323, accelerator deployment tool 324, and accelerator catalog 329 are shown to reside in main memory 320, those skilled in the art will recognize that these items are not necessarily all completely contained in main memory 320 at the same time. It should also be noted that the term "memory" is used herein generically to refer to the entire virtual memory of computer system 300, and may include the virtual memory of other computer systems coupled to computer system 300.

Processor 310 may be constructed from one or more microprocessors and/or integrated circuits. Processor 310 could be, for example, one or more POWER9 microprocessors. Processor 310 executes program instructions stored in main memory 320. Main memory 320 stores programs and data that processor 310 may access. When computer system 300 starts up, processor 310 initially executes the program instructions that make up operating system 322. Processor 310 also executes the computer program 323 and the accelerator deployment tool 324.

Programmable device(s) 312 can be any suitable programmable logic device that can be dynamically programmed by the processor 310. Examples of known suitable programmable logic devices include field-programmable gate arrays (FPGAs). However, the programmable device 312 broadly includes any programmable logic device that allows the processor 310 to dynamically program the programmable device 312, including known technologies as well as technologies that are developed in the future.

Although computer system 300 is shown to contain only a single processor and a single system bus, those skilled in the art will appreciate that an accelerator image generator as described herein may be practiced using a computer system that has multiple processors and/or multiple buses. In addition, the interfaces that are used preferably each include separate, fully programmed microprocessors that are used to off-load compute-intensive processing from processor 310. However, those skilled in the art will appreciate that these functions may be performed using I/O adapters as well.

Display interface 340 is used to directly connect one or more displays 365 to computer system 300. These displays 365, which may be non-intelligent (i.e., dumb) terminals or fully programmable workstations, are used to provide system administrators and users the ability to communicate with computer system 300. Note, however, that while display interface 340 is provided to support communication with one or more displays 365, computer system 300 does not necessarily require a display 365, because all needed interaction with users and other processes may occur via network interface 350.

Network interface 350 is used to connect computer system 300 to other computer systems or workstations 375 via network 370. Computer systems 375 represent computer systems that are connected to the computer system 300 via the network interface 350. Network interface 350 broadly represents any suitable way to interconnect electronic devices, regardless of whether the network 370 comprises present-day analog and/or digital techniques or via some networking mechanism of the future. Network interface 350 preferably includes a combination of hardware and software that allows communicating on the network 370. Software in the network interface 350 preferably includes a communication manager that manages communication with other computer systems 375 via network 370 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 350. In one suitable implementation, the network interface 350 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
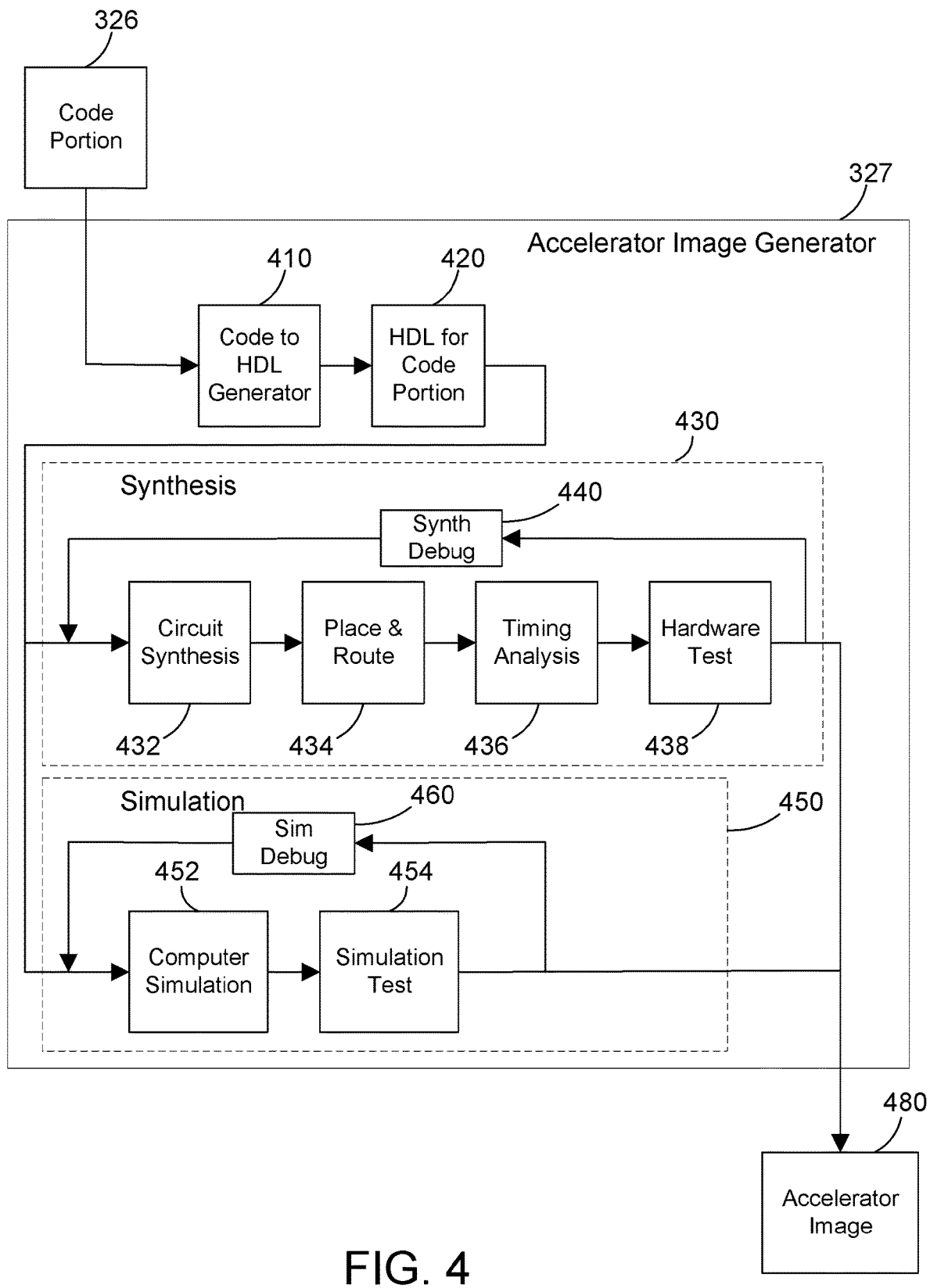
FIG. 4 is a flow diagram showing a specific implementation for how the accelerator image generator in FIG. 3 generates an accelerator image from a code portion.

FIG. 4 illustrates details of one suitable implementation of the accelerator image generator 327 shown in FIG. 3. The accelerator image generator 327 takes as input the code portion 326 shown in FIGS. 3 and 4. A code to HDL generator 410 preferably converts the code portion 326 to a corresponding representation of the code portion in a hardware description language (HDL), shown in FIG. 4 as HDL for code portion 420. Known suitable hardware description languages include VHDL or Verilog, but any suitable hardware description language could be used. There are known software tools for generating an HDL representation of computer code. For example, Xilinx's Vivado High Level Synthesis is a software tool that converts code written in the C programming language to HDL. This type of tool is often referred to in the art as a "C to HDL" tool or a "C to RTL" tool, where RTL refers to the Register Transfer Level representation of a code portion needed to implement the code portion in hardware. The Code to HDL Generator 410 in FIG. 4 could be a known software tool, or could be a software tool specifically designed for the accelerator image generator 327.

The HDL for the code portion 420 is fed into one or more processes that may include both synthesis and simulation. The synthesis process 430 is shown in the middle portion of FIG. 4 in steps 432, 434, 436, 438 and 440. The simulation process 450 is shown in the lower portion of FIG. 4 in steps 452, 454 and 460. The HDL for code portion 420 may be fed into the circuit synthesis block 432, which determines which hardware elements are needed. The place and route block 434 determines where on the programmable device to put the hardware elements, and how to route interconnections between those hardware elements. Timing analysis 436 analyzes the performance of the accelerator after the hardware elements have been placed and interconnections have been routed in block 434. Hardware test block 438 runs tests on the resulting accelerator image to determine whether timing and performance parameters are satisfied. The hardware test block 438 feeds back to synthesis debug block 440 when the design of the accelerator still needs improvement. This process may iterate several times.

The simulation process 450 takes in the HDL for the code portion 420, and performs a computer simulation 452 to test its functionality. A simulation test block 454 determines whether the simulated design functions as needed. The simulation test block 454 feeds back to a simulation debug block 460 when the design of the accelerator still needs improvement.

The accelerator image generator 327 may include either the synthesis block 430, the simulation block 450, or both. In the most preferred implementation, the accelerator image generator 327 includes both the synthesis block 430 and the simulation block 450. The synthesis process can be very time-consuming. The simulation block is typically much faster in testing the design of the HDL than the synthesis block. When both synthesis 430 and simulation 450 are both present, the accelerator image generator can use both of these in any suitable way or combination. For example, the simulation block 450 could be used initially to iterate a few times on the design, and when the design is mostly complete, the mostly-completed design could be fed into the synthesis block 430. In another implementation, the synthesis and simulation blocks could function in parallel and cooperate until the generation of the accelerator image is complete. Regardless of the specific process used, the accelerator image generator 327 generates for the code portion 326 an accelerator image 480 that corresponds to the code portion 326. Once the accelerator image 480 has been generated, the accelerator implementer 328 in FIG. 3 can load the accelerator image 480 into a programmable device 312 to produce an accelerator 314 corresponding to the code portion 326. The accelerator 314 in the programmable device 312 may then be called by the computer program in place of the code portion 326.

Figure 5:
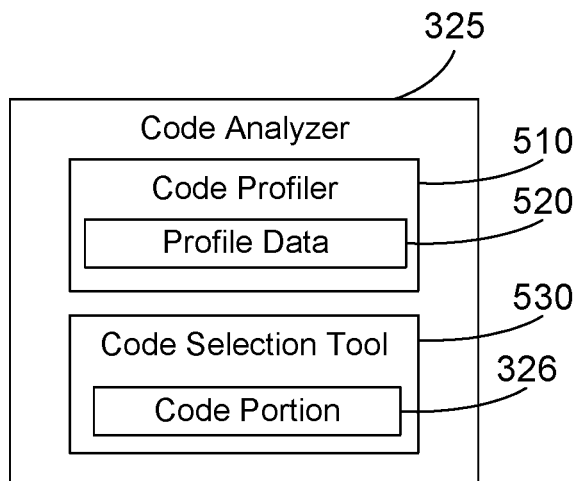
FIG. 5 is a block diagram of a specific implementation for the code analyzer in FIG. 3 that analyzes a computer program and selects a code portion.

Some details of one possible implementation for the code analyzer 325 in FIG. 3 are shown in FIG. 5. The code analyzer 325 can include a code profiler 510 that is used to profile the computer program. Profiling is done by the code profiler 510 preferably inserting instrumentation code into the computer program to generate profile data 520 as the computer program runs. The profile data 520 indicates many possible features of the computer program, including the frequency of executing different portions, the number or loop iterations, exceptions generated, data demand, bandwidth, time spent in a critical portion, etc. Software profilers are very well-known in the art, and are therefore not discussed in more detail here. For our purposes herein, suffice it to say the code profiler 510 generates profile data 520 that indicates run-time performance of the computer program being profiled.

The code analyzer 325 additionally includes a code selection tool 530 that identifies a code portion 326 that will be improved from being implemented in a hardware accelerator. Any suitable code portion could be identified according to any suitable criteria, algorithm or heuristic. For example, a portion of the code that performs floating-point calculations could be identified so that a corresponding floating-point accelerator could be generated to perform the floating-point calculations in the code. A portion of the code that performs a search of a database could be identified so a corresponding database search accelerator could be generated to replace the database search. A portion of the code that performs a specific function, such as data compression, XML parsing, packet snooping, financial risk calculations, etc., could also be identified. Of course, other code portions could be identified within the scope of the disclosure and claims herein. The code selection tool 530 can use any suitable criteria, algorithm or heuristic, whether currently known or developed in the future, to identify code portion 326. Once the code portion 326 in the computer program has been identified, a corresponding accelerator may be dynamically generated.

Figure 6:
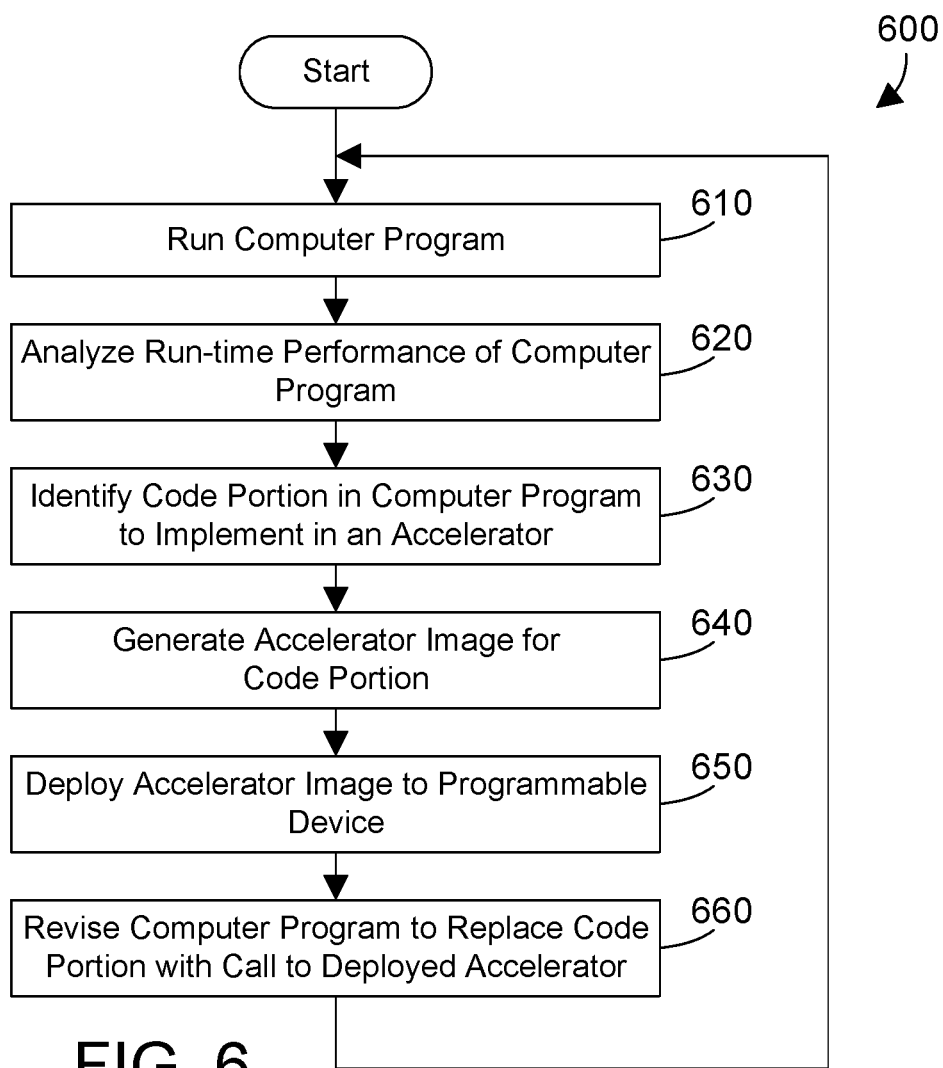
FIG. 6 is a flow diagram of a method for identifying a code portion in a computer program, dynamically generating and deploying an accelerator that corresponds to the code portion, then revising the computer program to replace the code portion with a call to the deployed accelerator.

Referring to FIG. 6, a method 600 starts by running the computer program (step 610). The run-time performance of the computer program is analyzed (step 620). This can be done, for example, by the code analyzer 325 shown in FIGS. 3 and 5 and discussed above. A code portion in the computer program is identified to implement in an accelerator (step 630). An accelerator image for the code portion is generated (step 640). The accelerator image is deployed to a programmable device (step 650). The computer program is then revised to replace the code portion with a call to the deployed accelerator (step 660). At this point, the deployed accelerator will perform the functions in hardware that were previously performed by the code portion, thereby improving the run-time performance of the computer program. Note that method 600 loops back to step 610 and continues, which means method 600 can iterate to continuously monitor the computer program and deploy accelerators, as needed, to improve performance of the computer program.

Figure 7:
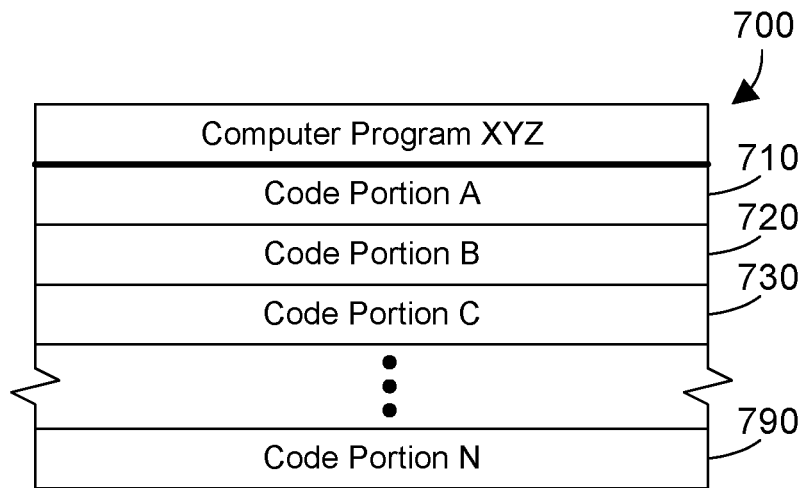
FIG. 7 is a block diagram showing a first sample computer program with different code portions.
Figure 8:
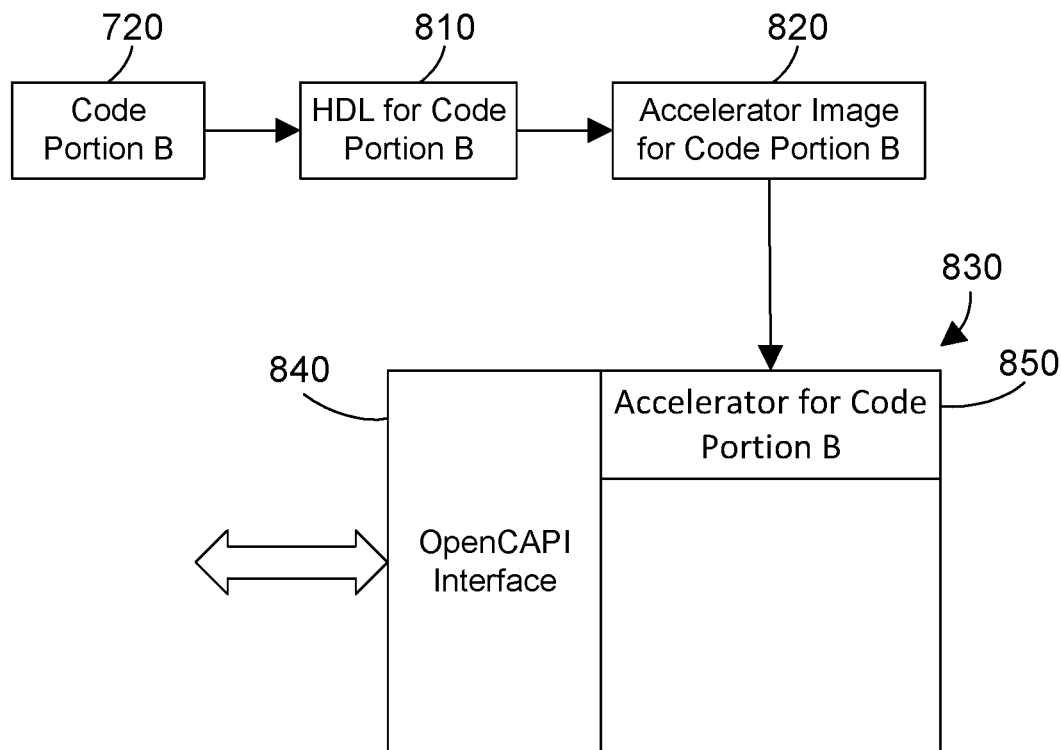
FIG. 8 is a block diagram showing how a code portion can be transformed to HDL, then to an accelerator image, which can be deployed to a programmable device to provide an accelerator.

Some examples are now provided to illustrate the concepts discussed above. FIG. 7 shows a sample computer program 700 that includes multiple code portions, shown in FIG. 7 as code portion A 710, code portion B 720, code portion C 730, . . . , code portion N 790. We assume code portion B 720 is identified as a code portion that will be improved from being implemented in a hardware accelerator. Code portion B 720 is then converted to a corresponding HDL representation 810, as shown in FIG. 8. The HDL for code portion B 810 is then used to generate an accelerator image for code portion B 820. This could be done, for example, using the method shown in FIG. 4, or using any other suitable method. Once the accelerator image for code portion B 820 has been generated, the accelerator image is loaded into a programmable device 830 to generate the accelerator for code portion B 850. Programmable device 830 is one suitable implementation for the programmable device 312 shown in FIG. 3, and preferably includes an OpenCAPI interface 840.

Figure 9:
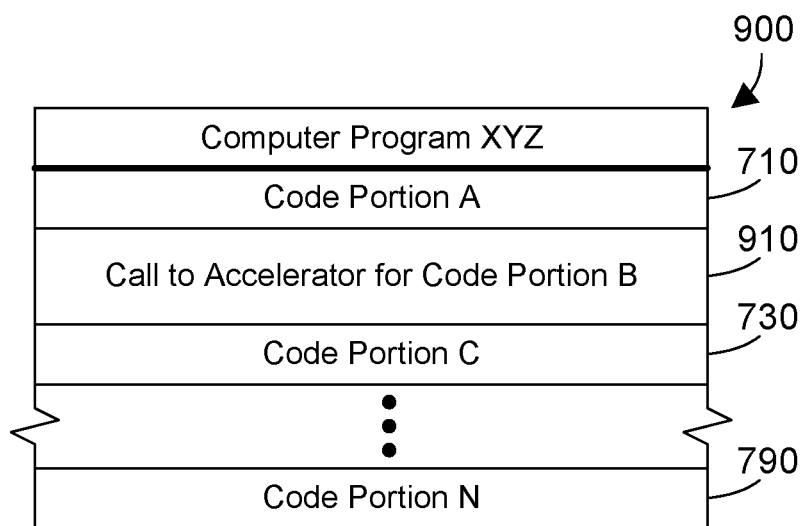
FIG. 9 is a block diagram showing the computer program in FIG. 7 after code portion B has been replaced with a call to the accelerator for code portion B.

Once the accelerator is deployed in the programmable device 830, the code portion B in the computer program is deleted and replaced by a call to the accelerator for code portion B 910 shown in FIG. 9. In the most preferred implementation, the accelerator for code portion B includes a return to the code that called it once the processing in the accelerator for code portion B is complete. In this manner the computer program 900, when it needs to execute what was previously code portion B, will make a call to the accelerator for code portion B, which will perform the needed functions in hardware, then return to the computer program. In this manner a suitable accelerator may be automatically generated for an identified code portion to increase the run-time performance of the computer program.

In a first implementation, an accelerator may be dynamically generated to improve the performance of a computer program, as shown in FIGS. 4-9 and described above. In a second implementation, once an accelerator is dynamically generated, it can be stored in a catalog so it may be reused when needed. FIG. 10 shows a sample accelerator catalog 1000, which is one suitable implementation for the accelerator catalog 329 shown in FIG. 3. An accelerator catalog may include any suitable data or information that may be needed for an accelerator or the corresponding code portion. For the specific example shown in FIG. 10, accelerator catalog includes each of the following fields: Name, Location, Least Recently Used (LRU), Most Recently Used (MRU), Dependencies, Capabilities, Latency, and Other Characteristics. The Name field preferably includes a name for the accelerator. The name field may also include a name for a code portion that corresponds to the accelerator. The location field preferably specifies a path that identifies the location for the accelerator image. While the accelerator image could be stored in the catalog 1000, in the most preferred implementation the catalog 1000 instead includes a path to storage external to the accelerator catalog 1000 where the accelerator image is stored. The least recently used (LRU) field could include the time when the accelerator was used the first time. In the alternative, the LRU field could include a flag that is set when the accelerator is the least recently used of all the accelerators in the catalog. The most recently used (MRU) field could include the time when the accelerator was last used. In the alternative, the MRU field could include a flag that is set when the accelerator is the most recently used of all the accelerators in the catalog. The error rate field provides a suitable error rate for the accelerator, and can be expressed in any suitable way. For the example in FIG. 10, the error rate is expressed as a number X of errors per 100 runs of the accelerator. The error rate field could include any suitable error information that could be, for example, dynamically monitored so an increase in the error rate could result in a notification to take corrective action. The dependencies field may indicate any dependencies the accelerator may have. For example, the dependencies field could specify the specific programmable device the accelerator was designed for. The dependencies field could also specify any dependencies on other accelerators. Thus, accelerator Acc1 in FIG. 10 has a dependency on Acc2, which means Acc1 needs Acc2 to also be implemented. The capabilities field can provide any suitable indication of the capabilities of the accelerator. In the two entries shown in FIG. 10, the capabilities are shown as floating-point (FP) Unit for Acc1 and Graphics for AccN. Note, however, the capabilities can be indicated in any suitable way. For example, the capabilities could include a specification of the code portion for which the accelerator was implemented. A separate index could be maintained that correlates each code portion to its corresponding accelerator, along with a descriptor or other data that describes attributes of the code portion. The capabilities field could include any suitable information, such as a pointer to the index, so the code portion corresponding to the accelerator could be easily identified.

The latency field preferably specifies average latency for the accelerator. For the example shown in FIG. 10, Acc1 has a latency of 1.0 microseconds while accelerator AccN has a latency of 500 nanoseconds. Latency could represent, for example, the time required for the accelerator to perform its intended function. The other characteristics field can include any other suitable information or data that describes or otherwise identifies the accelerator, its characteristics and attributes, and the code portion corresponding to the accelerator. For the two sample entries in FIG. 10, the other characteristics field indicates Acc1 includes a network connection, and AccN has an affinity to Acc5, which means AccN should be placed in close proximity to Acc5 on the programmable device, if possible. The various fields in FIG. 10 are shown by way of example, and it is within the scope of the disclosure and claims herein to provide an accelerator catalog with any suitable information or data.

Figure 11:
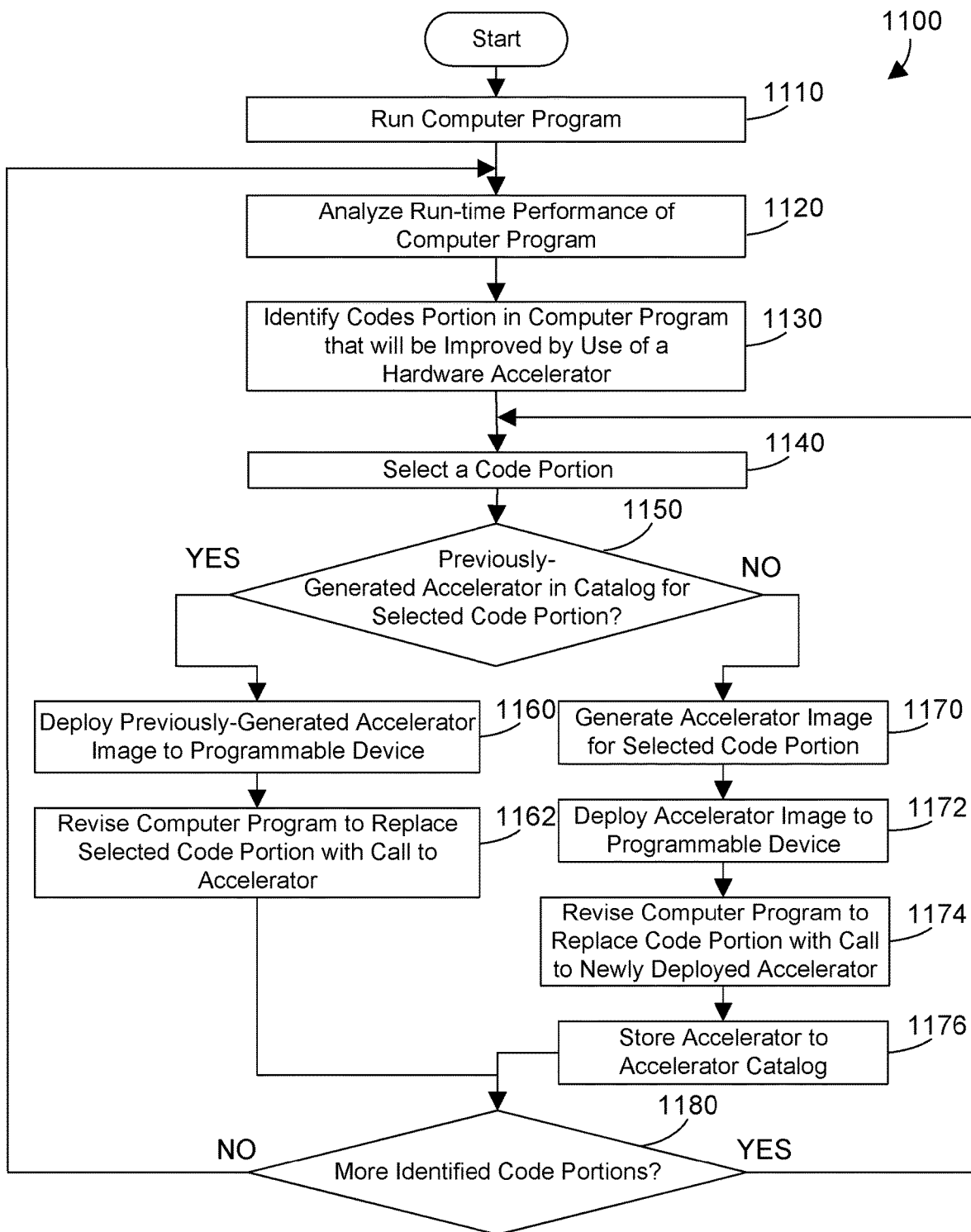
FIG. 11 is a flow diagram of a method for deploying an accelerator for a code portion when a catalog of previously-generated accelerators is maintained.

Referring to FIG. 11, a method 1100 in accordance with the second implementation begins by running the computer program (step 1110). The run-time performance of the computer program is analyzed (step 1120). One or more code portions in the computer program that will be improved by use of a hardware accelerator are identified (step 1130). One of the identified code portions is selected (step 1140). When there is a previously-generated accelerator in the accelerator catalog for the selected code portion (step 1150=YES), the previously-generated accelerator image is deployed to the programmable device (step 1160) to provide the accelerator. The computer program is then revised to replace the selected code portion with a call to the accelerator (step 1162). When there is no previously-generated accelerator in the catalog for the selected code portion (step 1150=NO), an accelerator image for the selected code portion is dynamically generated (step 1170), the accelerator image is deployed to a programmable device (step 1172) the computer program is revised to replace the code portion with a call to the newly deployed accelerator (step 1174), and the accelerator is stored to the accelerator catalog (step 1176). When the accelerator image is stored within the catalog entry, step 1176 write the accelerator image to the catalog. When the accelerator image is stored in storage external to the catalog, step 1176 stores the accelerator image to the external storage and writes an entry to the accelerator catalog that includes a path to the accelerator image in the external storage.

When there are more identified code portions (step 1180=YES), method 1100 loops back to step 1140 and continues. When there are no more identified code portions (step 1180=NO), method 1100 loops back to step 1120 and continues. This means method 1100 most preferably continuously monitors the computer program and dynamically generates and/or deploys accelerators as needed to improve the run-time performance of the computer program.

Figure 15:
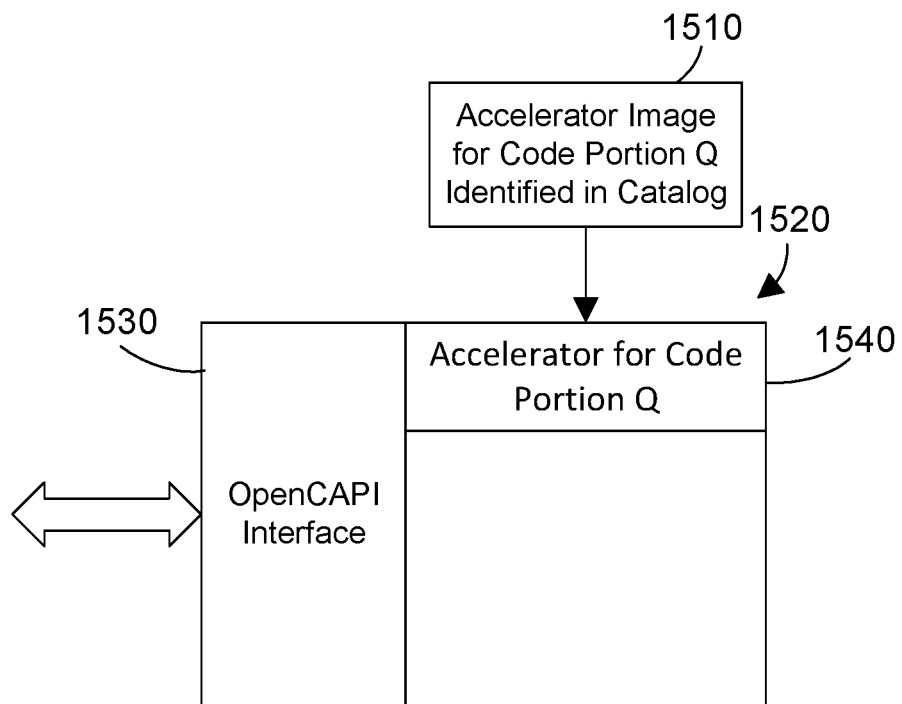
FIG. 15 is a block diagram showing the deployment of an accelerator image for code portion Q identified in the catalog in FIG. 14 to a programmable device.

An example is now provided to illustrate the concepts in FIG. 11 that relate to the second preferred implementation. FIG. 12 shows a sample computer program 1200 that includes many code portions, represented in FIG. 12 as code portion P 1210, code portion Q 1220, code portion R 1230, . . . , code portion Z 1290. We assume steps 1110, 1120 and 1130 in FIG. 11 are performed. In step 1130, we assume code portion Q 1220 and code portion R 1230 are identified as code portions that will be improved by implementing these code portions in an accelerator, as shown in table 1300 in FIG. 13. We further assume we have an accelerator catalog 1400 that is one suitable implementation for the accelerator catalog 329 shown in FIG. 3. Accelerator catalog 1400 has a single entry for AccQ, which we assume is an accelerator for code portion Q 1220 that was generated previously. Because the accelerator for code portion Q was previously-generated, the corresponding accelerator image can be used without having to generate the accelerator image anew. We assume code portion Q 1220 is selected in step 1140. There is a previously-generated accelerator in the catalog for code portion Q (step 1150=YES), so the previously-generated accelerator image corresponding to code portion Q 1510 is deployed to the programmable device (step 1160), as shown in FIG. 15. Deploying the accelerator image for code portion Q 1510 identified in the catalog to the programmable device 1520 results in implementing the accelerator for code portion Q 1540 in the programmable device 1520. The accelerator for code portion Q 1540 may then be called by the computer program to perform the functions of previous code portion Q in hardware, thereby increasing the run-time performance of the computer program. The programmable device 1520 is one suitable example of a programmable device 312 shown in FIG. 3, and preferably includes an OpenCAPI interface 1530.

Figure 16:
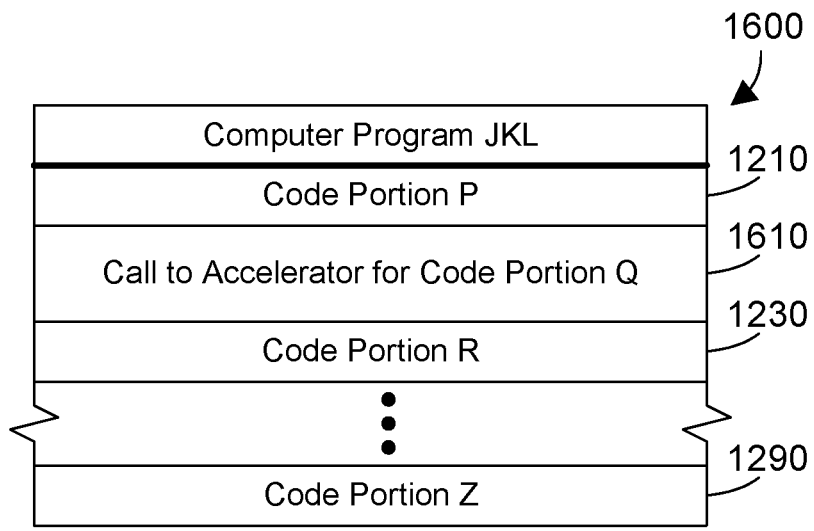
FIG. 16 is a block diagram showing the computer program in FIG. 12 after code portion Q has been replaced with a call to the accelerator for code portion Q.

The computer program is then revised to replace the selected code portion Q 1220 with a call to the accelerator for code portion Q (step 1162). FIG. 16 shows the computer program 1200 in FIG. 12 after the code portion Q has been replaced with the call to the accelerator for code portion Q, as shown at 1610 in FIG. 16. Thus, computer program 1600, instead of executing code portion Q, instead invokes the accelerator for code portion Q 1540 in the programmable device 1520 to increase the run-time performance of the computer program.

Figure 17:
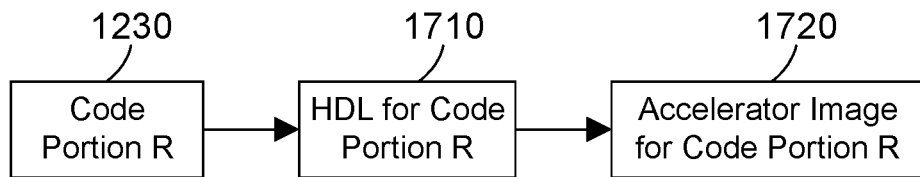
FIG. 17 is a block diagram showing generation of an accelerator image from code portion R in the computer program shown in FIGS. 12 and 16.
Figure 18:
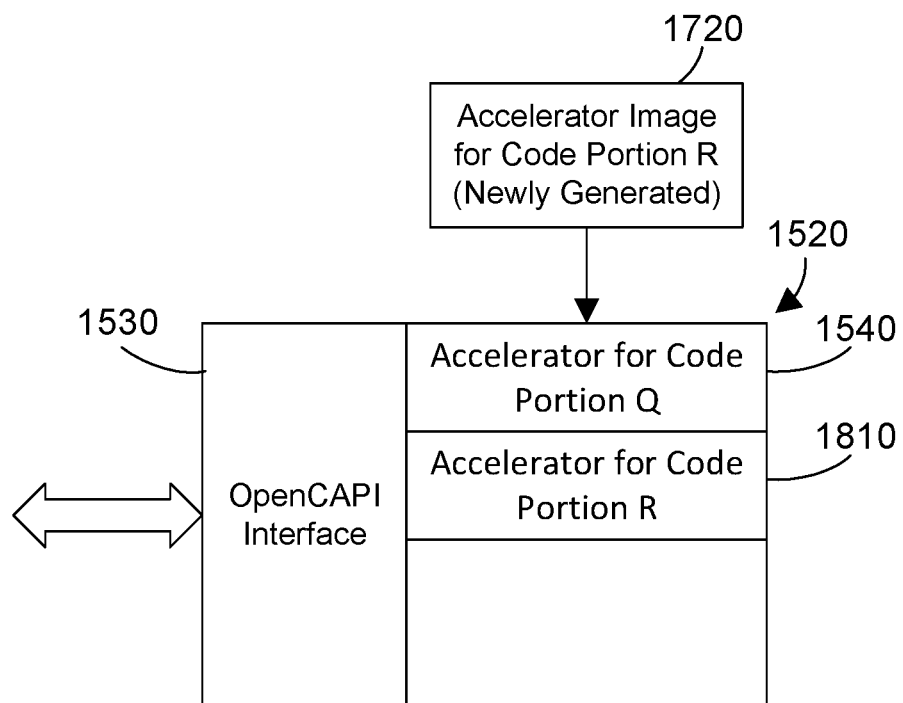
FIG. 18 is a block diagram showing the deployment of a newly-generated accelerator image for code portion R to a programmable device.
Figures 19, 20:
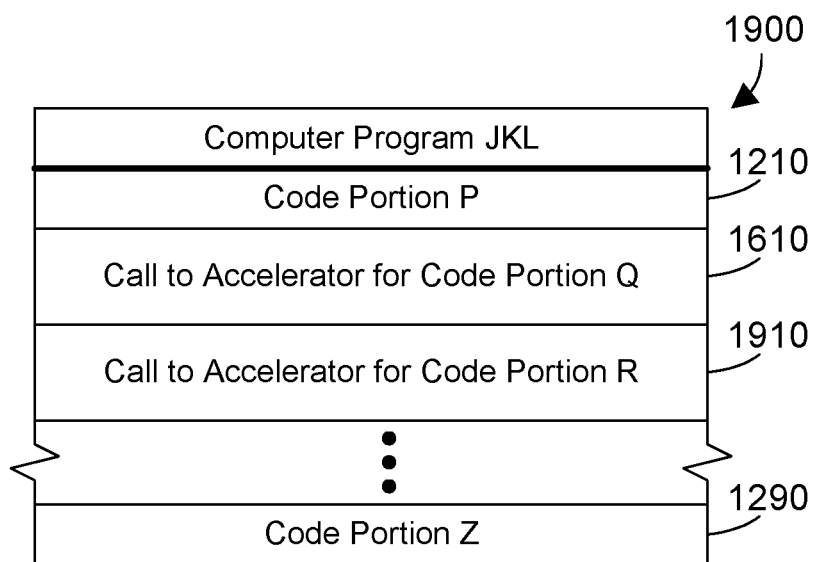
FIG. 19 is a is a block diagram showing the computer program in FIG. 16 after code portion R has been replaced with a call to the accelerator for code portion R.
FIG. 20 is a block diagram of the accelerator catalog 1400 shown in FIG. 14 after an entry is created representing the accelerator for code portion R.

There is still an identified code portion (step 1180=YES), namely code portion R shown in FIG. 13, so method 11 in FIG. 11 loops back to step 1140, where code portion R 1230 is selected (step 1140). There is no previously-generated accelerator in the catalog 1400 shown in FIG. 14 for code portion R (step 1150=NO), so an accelerator image is dynamically generated for code portion R (step 1170). This is represented in FIG. 17, where the code portion R 1230 is used to generate HDL for code portion R 1710, which is used to generate the accelerator image for code portion R 1720. The accelerator image for code portion R 1720, which was newly dynamically generated, is then deployed to the programmable device (step 1172). This is shown in FIG. 18, where the programmable device 1520 that already includes accelerator for code portion Q 1540 is loaded with the accelerator image for code portion R 1720 to generate the accelerator for code portion R 1810. The computer program is then revised to replace code portion R with the call to the accelerator for code portion R (step 1174), as shown at 1910 in FIG. 19. The accelerator for code portion R is also stored in the accelerator catalog (step 1176), resulting in the accelerator catalog 1400 containing entries AccQ and AccR corresponding to two accelerators, as shown in FIG. 20.

Figure 21:
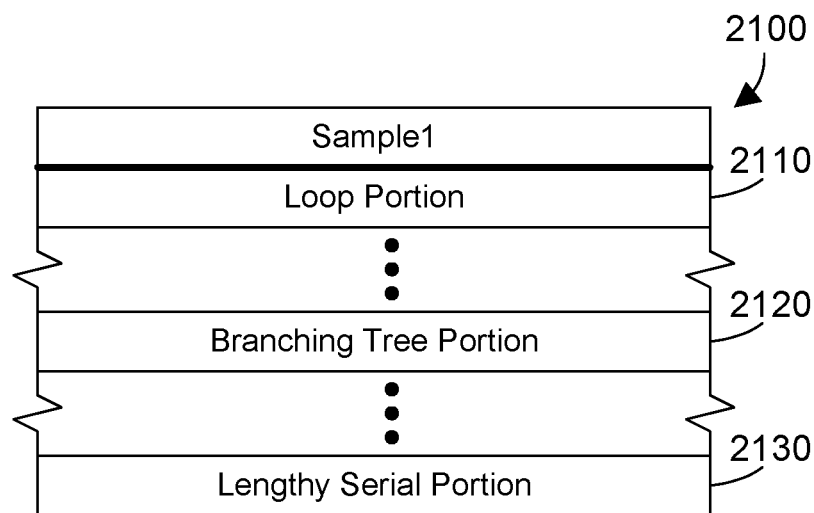
FIG. 21 is a block diagram of a sample computer program.
Figure 22:
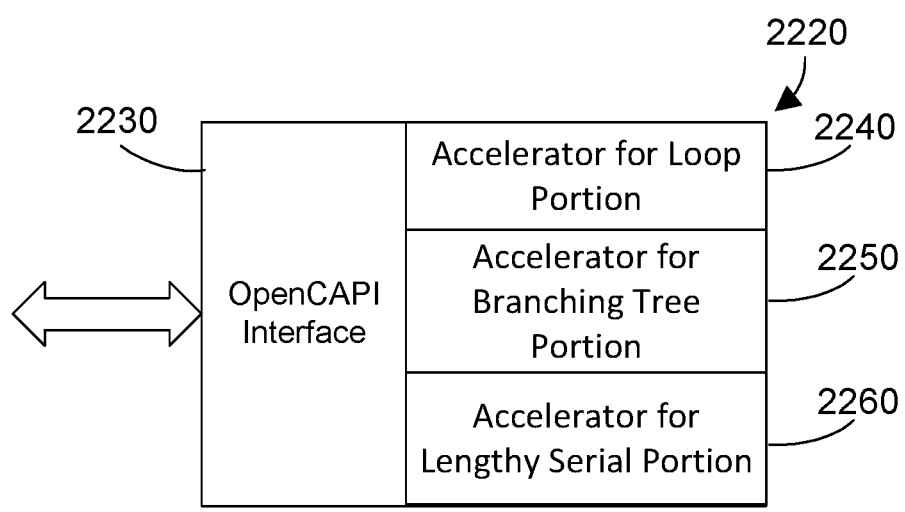
FIG. 22 is a block diagram of a programmable device that has an OpenCAPI interface and includes an accelerator for the loop portion in FIG. 21, an accelerator for branching tree portion in FIG. 21, and an accelerator for lengthy serial portion in FIG. 21.

A more specific example is shown in FIGS. 21 and 22. For this example we assume a computer program called Sample1 2100 includes three different code portions of interest, namely a loop portion 2110, a branching tree portion 2120, and a lengthy serial portion 2130. Loop portion 2110 is representative of a code portion that is a loop that can be unrolled because each iteration is largely independent from other iterations. Due to the independence of each iteration, the loop can be unrolled, and the loop function can be deployed to an accelerator so each iteration will run in parallel in hardware. Financial risk calculations sometimes include code portions such as loop portion 2110. Running different iterations of the loop in parallel in a hardware accelerator increases the run-time performance of the Sample1 computer program.

Computer program Sample1 2100 also includes a branching tree portion 2120. We assume for this example branching tree portion 2120 operates on one or more relatively deep branching trees. In this case, the branching tree portion 2120 can be deployed to an accelerator so each branch of the branching tree will run in parallel in hardware, the branch selection criteria will be calculated, and at the final stage of the logic, the result will be selected from the selected branch. Running different branches of the branching tree in parallel in a hardware accelerator increases the run-time performance of the Sample1 computer program.

Computer program Sample1 2100 also includes a lengthy serial portion 2130. We assume for this example the lengthy serial portion 2130 can be shortened by leveraging unique hardware capabilities in an accelerator. Some math functions, for example, could by lengthy serial portions that could be implemented in an accelerator. Running a lengthy serial portion in hardware increases the run-time performance of the Sample1 computer program.

We assume the code portions in FIG. 21 are identified according to profile data 520 generated by the code profiler 510 in FIG. 5. The criteria used by the code selection tool 530 to select the code portions 2110, 2120 and 2130, which are examples of code portion 326 in FIGS. 3 and 5, may be any suitable criteria. The three example code portions 2110, 2120 and 2130 in FIG. 21 as described above indicate suitable criteria that could be used by the code selection tool 530 to select code portions 2110, 2120 and 2130 to be implemented in one or more accelerators. Of course, the claims and disclosure herein expressly extend to any suitable criteria for the code selection tool 530 to select one or more code portions 326 to be implemented in one or more accelerators.

FIG. 22 shows a programmable device 2220 that has an OpenCAPI interface 2230 and includes an accelerator for loop portion 2240, an accelerator for branching tree portion 2250, and an accelerator for lengthy serial portion 2260. While these three accelerators are shown to be implemented in the same programmable device 2220 in FIG. 22, one skilled in the art will recognize these could be implemented in separate programmable devices as well.

Figure 23:
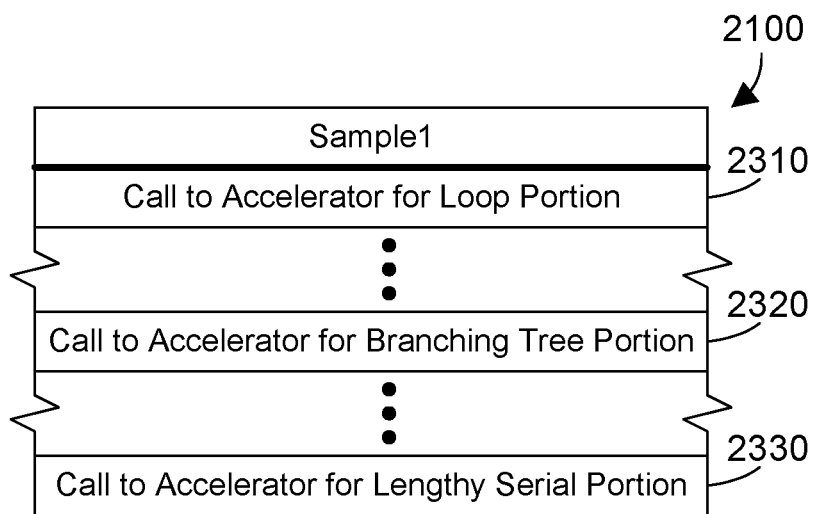
FIG. 23 is a block diagram of the computer program in FIG. 21 after the code portions have been replaced with calls to corresponding accelerators.

FIG. 23 shows the computer program Sample1 2100 after the code portions shown in FIG. 21 are replaced with calls to the hardware accelerators shown in FIG. 22. Thus, loop portion 2110 in FIG. 21 has been replaced by a call to the accelerator for loop portion 2310; the branching tree portion 2320 in FIG. 21 has been replaced by a call to the accelerator for the branching tree portion 2320; and the lengthy serial portion 2130 in FIG. 21 has been replaced by a call to the accelerator for the lengthy serial portion 2330. Because the Sample1 computer program 2100 in FIG. 23 now includes calls to hardware accelerators, the run-time performance of the computer program 2100 is increased.

Figure 24:
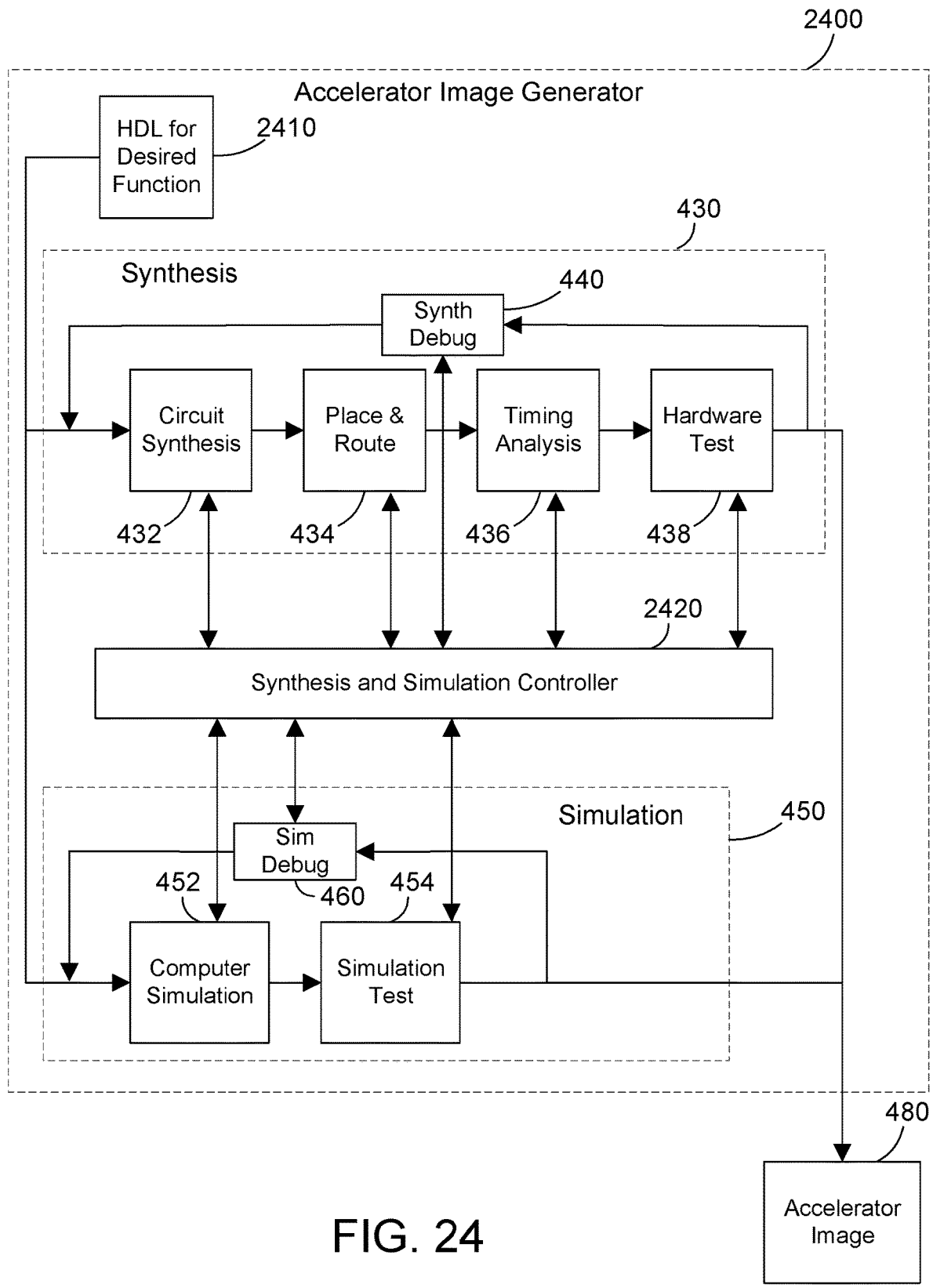
FIG. 24 is a block diagram of an accelerator image generator.

Referring to FIG. 24, an accelerator image generator 2400 is shown, which is similar in some respects to the accelerator image generator 327 shown in FIGS. 3 and 4. The accelerator image generator 2400 takes as input HDL for a desired function 2410. In one particular example, the HDL for a desired function 2410 is HDL for code portion 420 shown in FIG. 3. The accelerator image generator 2400 includes a synthesis block 430 and a simulation block 450, similar to those same blocks shown in FIG. 4. The accelerator image generator 2400 additionally includes a synthesis and simulation controller 2420 that routes work to the synthesis block 430 and simulation block 450, monitors their progress, and performs other control functions that affect the generation of the accelerator image 480. The synthesis block 430 preferably includes functional blocks that include circuit synthesis 432, place and route 434, timing analysis 436, hardware test 438, and a synthesis debug path 440 that feeds information back to circuit synthesis 432. The simulation block 450 preferably includes functional blocks that include computer simulation 452, simulation test 454, and a simulation debug path 460 that feeds information back to computer simulation 452. Note the functions of these functional blocks in FIG. 24 are described above with respect to the same functional blocks shown in FIG. 4.

In the most preferred implementation, the synthesis and simulation controller monitors each of the functional blocks 432, 434, 436, 438 and 440 in the synthesis block 430, and monitors each of the functional blocks 452, 454 and 460 in the simulation block 450, as shown by the two-way arrows in FIG. 24 between the synthesis and simulation controller and each of the functional blocks. The accelerator image generator 2400 is done when it outputs an accelerator image 480, which can then be deployed to a programmable device. In the most preferred implementation, the accelerator image 480 output by the accelerator image generator 2400 is received by the accelerator deployment tool 324, which then deploys the accelerator image 480 to a programmable device, thereby providing a hardware accelerator corresponding to the accelerator image that can be called as needed.

Figure 25:
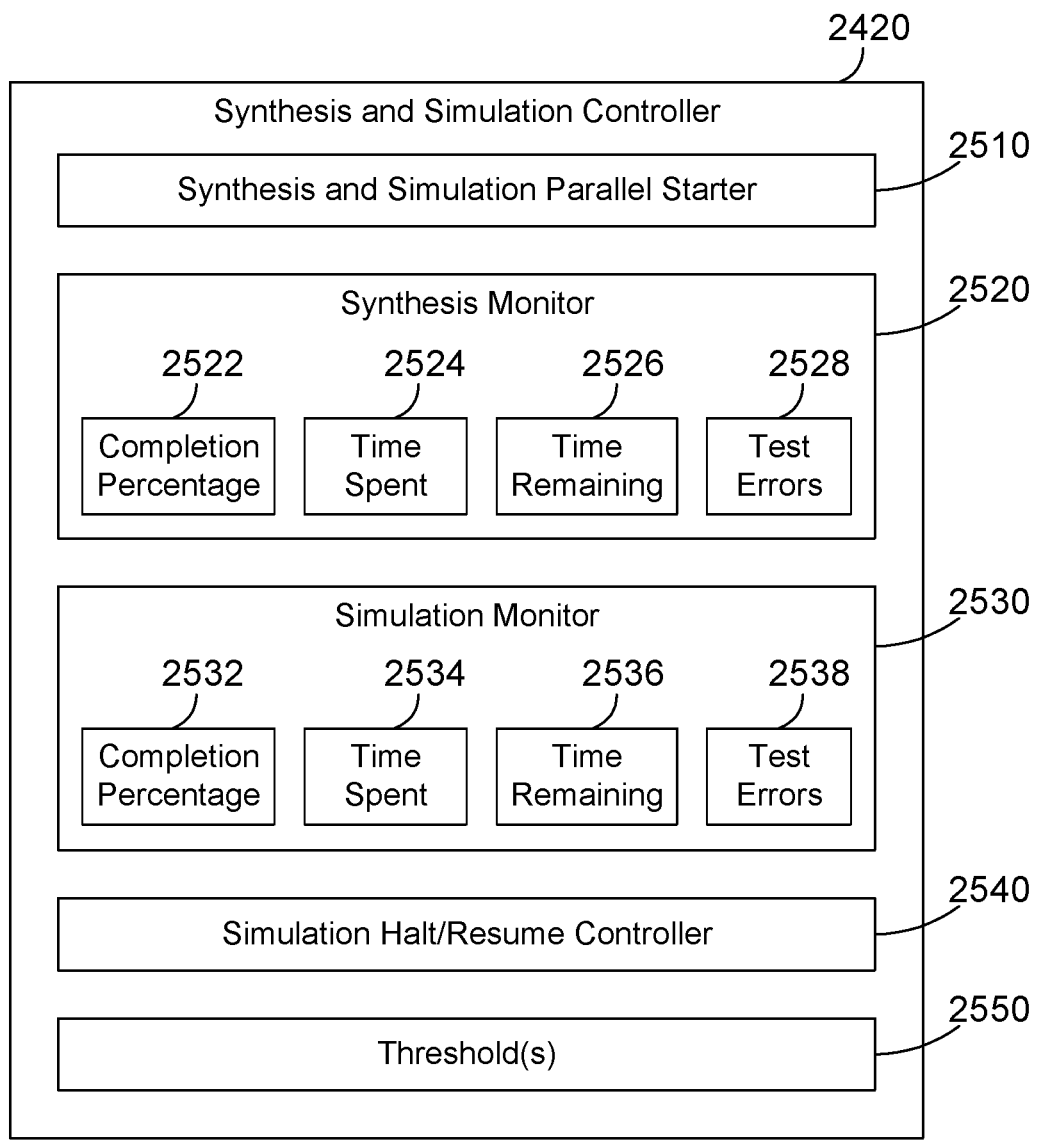
FIG. 25 is a block diagram showing additional details for the synthesis and simulation controller shown in FIG. 24.

FIG. 25 shows some additional features of the synthesis and simulation controller 2420 shown in FIG. 24. The synthesis and simulation controller 2420 includes a synthesis and simulation parallel starter 2510, a synthesis monitor 2520, a simulation monitor 2530, a simulation halt/resume controller 2540, and one or more thresholds 2550. The synthesis and simulation parallel starter 2510 routes the HDL for a desired function 2410 to both the synthesis block 430 and the simulation block 450 shown in FIG. 24 so both of these can work on the HDL for a desired function 2410 in parallel. The synthesis monitor 2520 monitors the functional blocks 432, 434, 436, 438 and 440 in the synthesis block 430, and can determine based on monitoring those functional blocks the completion percentage 2522 for the synthesis block, or for any or all of the functional blocks in the synthesis block; the time spent 2524 so far doing synthesis; the estimated time remaining 2526 for the synthesis; and a log of test errors 2528 during synthesis. Similarly, the simulation monitor 2530 monitors the functional blocks 452, 454 and 460 in the simulation block 450, and can determine based on monitoring those functional blocks the completion percentage 2532 for the simulation block, or for any or all of the functional blocks in the simulation block; the time spent 2534 so far doing simulation; the estimated time remaining 2536 for the simulation; and a log of test errors 2538 during simulation. The simulation halt/resume controller 2540 can halt simulation based on certain conditions, and can resume simulation based on other conditions. The threshold(s) 2550 are preferably one or more defined thresholds that determine how the synthesis and simulation controller 2420 controls the synthesis block and the simulation block. In one suitable example, a threshold could be defined at the conclusion of the timing analysis block 436 in FIG. 24. This would allow the synthesis and simulation to continue in parallel until the timing analysis 436 has completed, at which point the simulation could be halted and the work of generating the accelerator image could be finished by the synthesis block 430. In another example, the threshold(s) 2550 could include a hardware confidence threshold that, once met, would allow halting the simulation and continuing with synthesis. The hardware confidence threshold could be defined in any suitable way. For example, the hardware confidence threshold could be a simple percentage threshold for completion of synthesis. Once the completion percentage 2522 exceeds the hardware confidence threshold, the simulation can be halted. In another example, the hardware confidence threshold could have a more complex definition, such as 80% complete with fewer than a specified number of test errors 2528. The hardware confidence threshold could be initially set to a value that will cause simulation to be halted, and if excessive test errors 2528 occur during synthesis, the simulation could be resumed and the hardware confidence threshold could be adjusted up so that simulation will be halted again only when the higher hardware confidence threshold is reached. Because simulation is typically much faster than synthesis, the results of one or more simulation cycles can be fed into the synthesis block 430 by the synthesis and simulation controller 2420 to speed the synthesis and to refine the synthesized circuit according to the results of the cycles of the simulation block 450. Some examples are shown in FIGS. 26 and 27.

Figure 26:
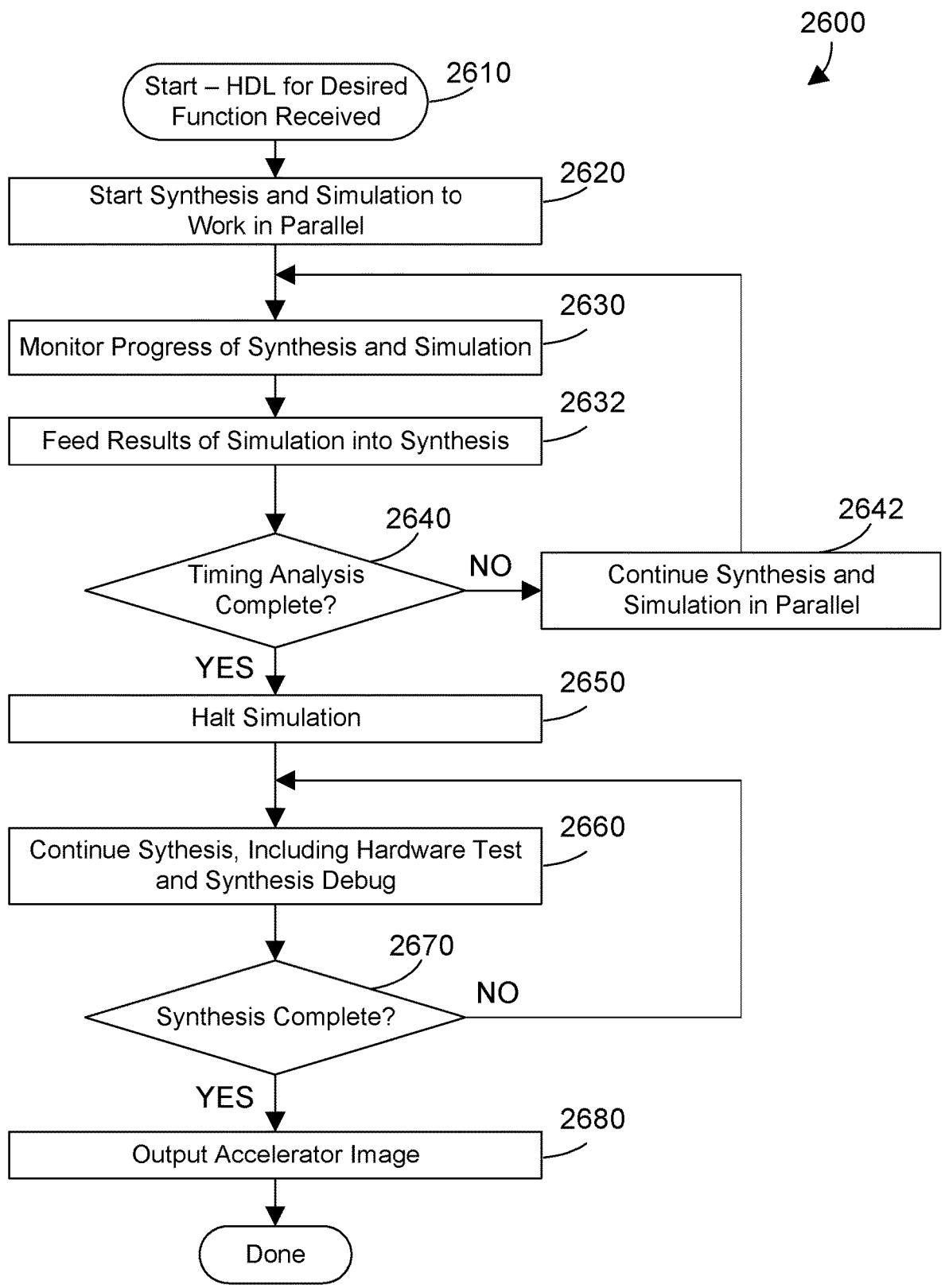
FIG. 26 is a flow diagram of a first exemplary method for performing simultaneous synthesis and simulation to generate an accelerator image.

Referring to FIG. 26, a method 2600 is preferably performed by the accelerator image generator 2400 shown in FIG. 24. Method 2600 starts when HDL for the desired function is received (step 2610). Synthesis and simulation are both started so they can work in parallel (step 2620). The progress of the synthesis and simulation is monitored (step 2630). The results of the simulation are fed into the synthesis (step 2632). For example, the passing rate of test cases could be fed into the synthesis. If the passing rate of test cases in simulation is too low, for example, synthesis could stop because the function is not correct, according to the low passing rate in simulation. Another result of simulation that could be fed into the synthesis is validated input constraints. If the inputs to a function will never do certain things, synthesis can leverage that insight during optimization. Another result of simulation that could be fed into synthesis can be the results of working on different pieces of the design serially. For example, let's assume a design is split into four quadrants that are processed serially in simulation. Once simulation has finished simulation of the first quadrant, it could feed the results of the simulation into synthesis while simulation then works on the second quadrant, and so on. As long as the timing analysis in the synthesis block is not complete (step 2640=NO), continue synthesis and simulation in parallel (step 2642), and loop back to step 2630 and continue. For the specific example in FIG. 26, we assume the predefined threshold for determining when to halt simulation is when the timing analysis is complete in step 2640. Once timing analysis is complete (step 2640=YES), simulation is halted (step 2650). Synthesis continues, including the hardware test and synthesis debug (step 2660). As long as synthesis is not complete (step 2670=NO), method 2600 loops back to step 2660 and continues until synthesis is complete (step 2670=YES). At this point the final accelerator image is output (step 2680). Method 2600 is then done. The accelerator image can then be deployed to a programmable device to provide a hardware accelerator corresponding to the accelerator image.

Figure 27:
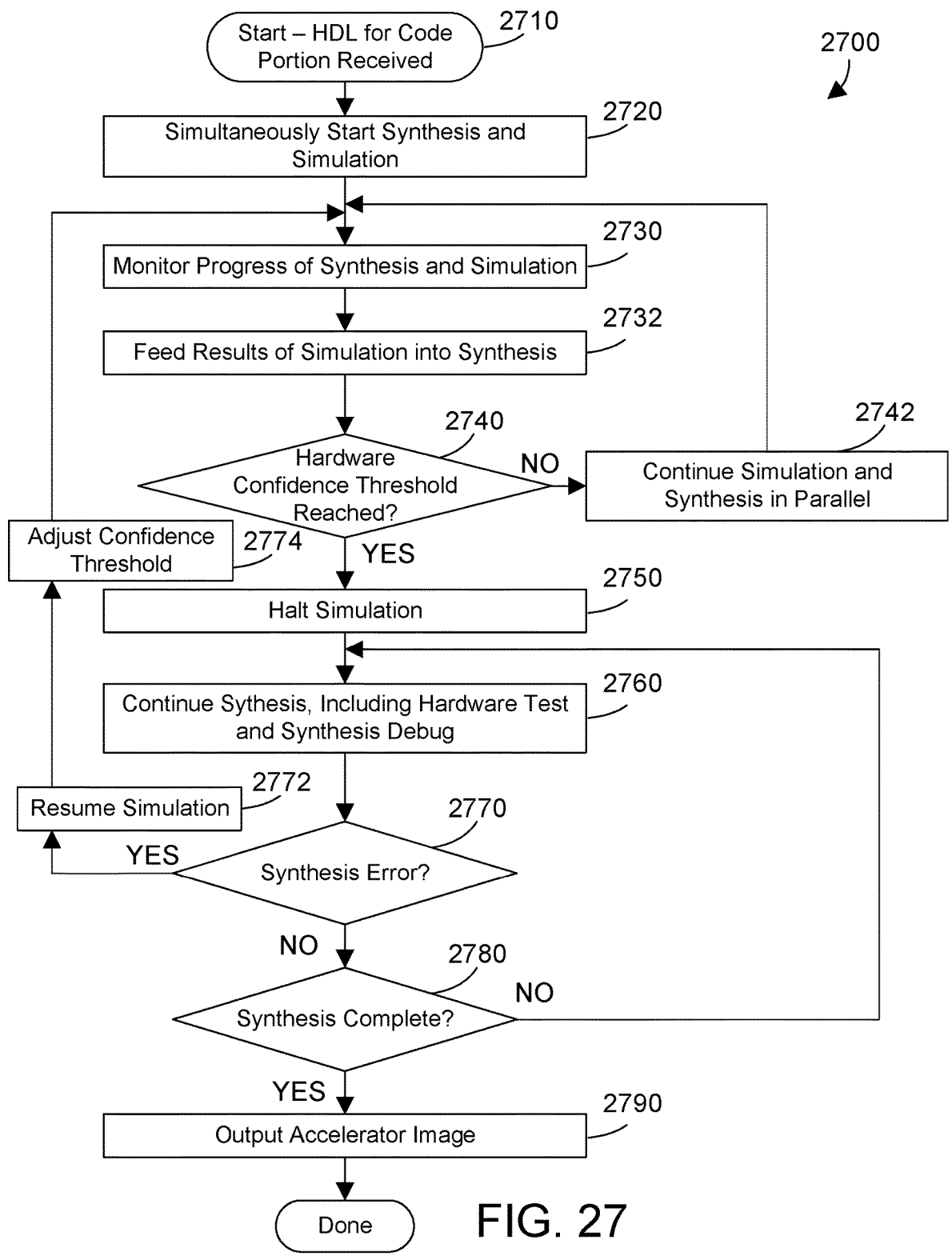
FIG. 27 is a flow diagram of a second exemplary method for performing simultaneous synthesis and simulation to generate an accelerator image.

Another specific example is shown in method 2700 in FIG. 27, which is preferably performed by the accelerator image generator 2400 shown in FIG. 24. Method 2700 starts when HDL for the desired function is received (step 2710). Synthesis and simulation are both started so they can work in parallel (step 2720). The progress of the synthesis and simulation is monitored (step 2730). The results of the simulation are fed into the synthesis (step 2732). As long as the hardware confidence threshold for the synthesis is not reached (step 2740=NO), method 2700 continues simulation and synthesis in parallel (step 2742) and loops back to step 2730. Once the hardware confidence threshold is reached (step 2740=YES), simulation is halted (step 2750). Synthesis is continued, including hardware test and synthesis debug (step 2760). When there is a synthesis error (step 2770=YES), simulation is resumed (step 2772) and the hardware confidence threshold is adjusted upwards (step 2774), followed by step 2730. Note the error in step 2770 can be defined in any suitable way. For example, the synthesis error in step 2770 could be any error that occurs during synthesis. The synthesis error in step 2770 could be an aggregate of errors that exceeds some defined threshold. In another example, errors may be categorized into minor errors and major errors in step 2770, with major errors causing a YES and minor errors causing a NO in step 2770. Any suitable definition of "synthesis error" could be used in step 2770 within the scope of the disclosure and claims herein. As long as synthesis is not complete (step 2780=NO), method 2700 loops back to step 2760 and continues. When synthesis is complete (step 2780=YES), the accelerator image is output (step 2790). Method 2700 is then done.

A simple example is now given for method 2700 in FIG. 27. Let's assume for this example the hardware confidence threshold is defined to be: synthesis is 70% complete based on time with no major errors. In referring to FIG. 27, we assume method 2700 continues to loop from steps 2730, 2732, 2740 and 2742 until the hardware confidence threshold is reached, meaning synthesis is 70% complete with no major errors (step 2740=YES). We assume for this example simulation is halted (step 2750), and synthesis continues, including hardware test and synthesis debug (step 2760). We assume for this example a major error occurs during the synthesis (step 2770=YES), which causes method 2700 to resume simulation (step 2772) and adjust the hardware confidence threshold upwards (step 2774). For example, the hardware confidence level can be changed to 80% complete with no major errors. Simulation and synthesis can then continue in parallel in steps 2730, 2732, 2740 and 2742 until the synthesis is 80% complete with no errors (step 2740=YES). This simple example shows how the hardware confidence threshold can be adjusted when the synthesis encounters errors.

Figure 28:
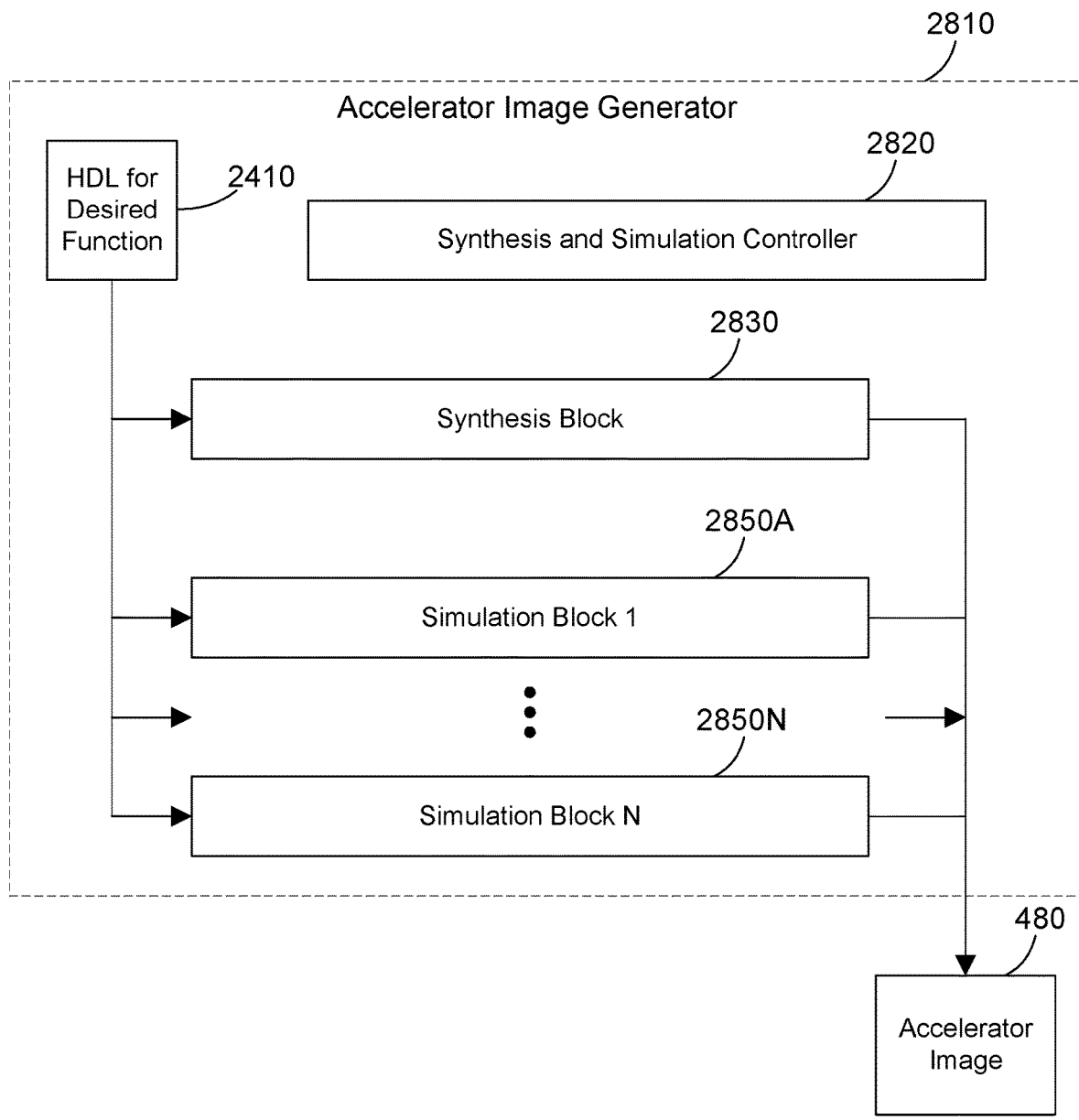
FIG. 28 is a block diagram of an accelerator image generator that includes multiple parallel simulation paths.

An alternative embodiment for the accelerator image generator is shown in FIG. 28, where accelerator image generator 2810 includes a synthesis block 2830 and multiple parallel simulation blocks, shown in FIG. 28 as 2850A, ..., 2850N. The synthesis block 2830 could be, for example, the synthesis block 430 shown in FIGS. 4 and 24. Similarly, the simulation blocks 2850A, ..., 2850N could be, for example, the simulation block 450 shown in FIGS. 4 and 24. It is understood the synthesis and simulation controller 2820 in FIG. 28 will monitor and control the synthesis block 2830 and the multiple simulation blocks 2850A, ..., 2850N similar to how the synthesis and simulation controller 2420 in FIGS. 24 and 25 function, as described in detail above. By providing multiple simulation blocks in parallel, different parts of the HDL for desired function 2410 can be simulated in parallel, thereby speeding up how quickly the simulation is performed. In this alternative embodiment, the HDL for desired function 2410 is parsed into different parts, and those different parts can then be input to multiple simulation blocks so these different parts can be simulated simultaneously. The parallel simulation blocks allow a larger number of test cases to be processed in a shorter period of time that is possible without the parallel simulation blocks.

The accelerators shown in FIGS. 8, 15, 18 and 22 include an OpenCAPI interface. Note, however, the OpenCAPI interface is not strictly necessary to dynamically generate and deploy an accelerator as disclosed and claimed herein. Deploying an accelerator to a programmable device that includes an OpenCAPI interface is useful because the OpenCAPI specification is open, allowing anyone to develop to the specification and interoperate in a cloud environment. In addition, the OpenCAPI interface provides lower latency, reducing the "distance" between an accelerator and the data it may consume or produce. Furthermore, OpenCAPI provides higher bandwidth, increasing the amount of data an accelerator can consume or produce in a given time. These advantages of OpenCAPI combine to provide a good environment for implementing a code portion of a computer program in an accelerator, and to lower the threshold for a code portion to be better in an accelerator than in the computer program. However, the disclosure and claims herein apply equally to accelerators that do not include or have access to an OpenCAPI interface.

An accelerator image generator includes a synthesis block and a simulation block. The accelerator image generator receives a hardware description language representation for a desired function, inputs the hardware description language representation for the desired function to the synthesis block and to the simulation block so the synthesis block and simulation block work in parallel, monitors progress of the synthesis block and the simulation block, and when a defined threshold is reached in the synthesis block, halts the simulation block while the synthesis block continues until the synthesis block outputs an accelerator image for deployment to a programmable device. When an error is detected in the synthesis block following halting of the simulation block, the simulation block may be resumed, and the defined threshold may be adjusted. The accelerator image can be deployed to a programmable device to provide a hardware accelerator corresponding to the accelerator image.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   an accelerator image generator residing in the memory and executed by the at least one processor, the accelerator image generator comprising:
      a synthesis block that comprises circuit synthesis, place and route, timing analysis, hardware test, and a synthesis debug feedback path;
      a simulation block that comprises computer simulation, simulation test, and a simulation debug feedback path; and
      a synthesis and simulation controller that:
         receives a hardware description language representation for a desired function;
         inputs the hardware description language representation for the desired function to the synthesis block and to the simulation block such that the synthesis block and simulation block process the hardware description language representation in parallel;
monitors progress of the synthesis block and the simulation block; and
when a defined threshold that specifies a degree of completion for the synthesis block is reached in the synthesis block, halts the simulation block while the synthesis block continues until the synthesis block outputs an accelerator image for deployment to a programmable device.

2. The apparatus of claim 1 wherein synthesis and simulation controller feeds results from the simulation block into the synthesis block.

3. The apparatus of claim 1 wherein the defined threshold comprises completion of the timing analysis in the synthesis block.

4. The apparatus of claim 1 wherein the defined threshold comprises a hardware confidence threshold for the synthesis block.

5. The apparatus of claim 4 wherein the hardware confidence threshold comprises a specified completion percentage for the synthesis block.

6. The apparatus of claim 5 wherein the specified completion percentage comprises percentage completion for the timing analysis or the hardware test.

7. The apparatus of claim 5 wherein the synthesis and simulation controller detects an error in the synthesis block after the simulation block has been halted, and in response, resumes the simulation block and adjusts the confidence threshold to a higher specified completion percentage for the synthesis block.

8. The apparatus of claim 1 wherein the accelerator image generator comprises a plurality of parallel simulation blocks each comprising computer simulation, simulation test, and a simulation debug feedback path, wherein a different portion of the hardware description language representation for the desired function is input to each of the plurality of parallel simulation blocks.

9. The apparatus of claim 1 further comprising an accelerator deployment tool residing in the memory and executed by the at least one processor, wherein the accelerator deployment tool receives the accelerator image from the accelerator image generator and deploys the accelerator image to the programmable device to provide a hardware accelerator corresponding to the accelerator image.

10. An apparatus comprising:
at least one processor;
a memory coupled to the at least one processor;
an accelerator image generator residing in the memory and executed by the at least one processor, the accelerator image generator comprising:
  a synthesis block that comprises circuit synthesis, place and route, timing analysis, hardware test, and a synthesis debug feedback path;
  a first simulation block that comprises first computer simulation, first simulation test, and a first simulation debug feedback path;
  a second simulation block in parallel with the first simulation block that comprises second computer simulation, second simulation test, and a second simulation debug feedback path; and
  a synthesis and simulation controller that:
    receives a hardware description language representation for a desired function;
    inputs the hardware description language representation for the desired function to the synthesis block and to the first and second simulation blocks such that the synthesis block and first and second simulation blocks process the hardware description language representation in parallel;
    monitors progress of the synthesis block and the simulation blocks;
    feeds results from the simulation blocks into the synthesis block; and
    when a confidence threshold for the synthesis block is reached, halts the simulation blocks while the synthesis block continues, detects an error in the synthesis block after halting the simulation blocks, and in response, resumes the simulation blocks and adjusts the confidence threshold to a higher specified completion percentage for the synthesis block; and
    when the adjusted confidence threshold for the synthesis block is reached, halts the simulation blocks while the synthesis block continues until the synthesis block outputs an accelerator image;
an accelerator deployment tool residing in the memory and executed by the at least one processor, wherein the accelerator deployment tool receives the accelerator image from the accelerator image generator and deploys the accelerator image to a programmable device to provide a hardware accelerator corresponding to the accelerator image.

11. A method for generating an accelerator image, the method comprising:
providing a synthesis block that comprises circuit synthesis, place and route, timing analysis, hardware test, and a synthesis debug feedback path;
providing a simulation block that comprises computer simulation, simulation test, and a simulation debug feedback path;
receiving a hardware description language representation for a desired function;
inputting the hardware description language representation for the desired function to the synthesis block and to the simulation block such that the synthesis block and simulation block process the hardware description language representation in parallel;
monitoring progress of the synthesis block and the simulation block; and
when a defined threshold that specifies a degree of completion for the synthesis block is reached in the synthesis block, halting the simulation block while the synthesis block continues until the synthesis block outputs an accelerator image for deployment to a programmable device.

12. The method of claim 11 further comprising feeding results from the simulation block into the synthesis block.

13. The method of claim 11 wherein the defined threshold comprises completion of the timing analysis in the synthesis block.

14. The method of claim 11 wherein the defined threshold comprises a hardware confidence threshold for the synthesis block.

15. The method of claim 14 wherein the hardware confidence threshold comprises a specified completion percentage for the synthesis block.

16. The method of claim 15 wherein the specified completion percentage comprises percentage completion for the timing analysis or the hardware test.

17. The method of claim 15 further comprising:
detecting an error in the synthesis block after the simulation block has been halted, and in response:
  resuming the simulation block; and
  adjusting the confidence threshold to a higher specified completion percentage for the synthesis block.
18. The method of claim 11 further comprising:
providing a second simulation block that comprises second computer simulation, second simulation test, and a second simulation debug feedback path;
inputting a different portion of the hardware description language representation for the desired function to the first and second simulation blocks.
19. The method of claim 11 further comprising:
receiving the accelerator image; and
deploying the accelerator image to the programmable device to provide a hardware accelerator corresponding to the accelerator image.

\* \* \* \* \*